US008872136B1

(12) United States Patent
Jackson et al.

(10) Patent No.: US 8,872,136 B1
(45) Date of Patent: Oct. 28, 2014

(54) PLANT ERADICATION USING NON-MUTATING LOW ENERGY RAPID UNNATURAL DUAL COMPONENT ILLUMINATION PROTOCOL (RUDCIP) IN FOUR PARAMETERS

(75) Inventors: Jonathan A. Jackson, Dayton, OH (US); Patrick A. Jackson, Dayton, OH (US)

(73) Assignee: Global Neighbor, Inc., Dayton, OH (US)

( * ) Notice: Subject to any disclaimer, the term of this patent is extended or adjusted under 35 U.S.C. 154(b) by 320 days.

(21) Appl. No.: 13/553,797

(22) Filed: Jul. 19, 2012

(51) Int. Cl.
*A01M 21/00* (2006.01)

(52) U.S. Cl.
CPC ..................... *A01M 21/00* (2013.01)
USPC ..................... 250/492.1; 47/58.1 LS; 47/1.43; 47/1.44

(58) Field of Classification Search
USPC .............. 250/492.1, 493.1; 47/58.1 LS, 1.43, 47/1.44
See application file for complete search history.

(56) References Cited

U.S. PATENT DOCUMENTS

| | | | |
|---|---|---|---|
| 5,929,455 A | 7/1999 | Jensen | |
| 6,795,568 B1 * | 9/2004 | Christensen et al. | 382/110 |
| 7,954,276 B1 * | 6/2011 | Jackson | 47/1.44 |
| 8,141,292 B1 * | 3/2012 | Jackson | 47/1.44 |
| 8,365,464 B1 * | 2/2013 | Jackson | 47/1.44 |
| 2004/0200141 A1 | 10/2004 | Whitcomb | |
| 2006/0016125 A1 | 1/2006 | Krauss et al. | |
| 2008/0050440 A1 | 2/2008 | Wakamura et al. | |
| 2008/0120736 A1 | 5/2008 | Hurst | |
| 2013/0238201 A1 * | 9/2013 | Redden | 701/50 |
| 2013/0255150 A1 * | 10/2013 | Karpinski et al. | 47/58.1 LS |

OTHER PUBLICATIONS

Author Unknown but inferred to be Kaj Jensen (initials of "KJ" are indicated on this reference); Title=OptoCleaner Early Research (This title inferred); Date= Feb. 2005; pp. 1-2; No Volume or Issue Number; Publisher = Electro Light ApS, Kaerparken 4, DK-2800 Lyngby, Denmark; Ancillary Information Listed = Tel: +45 4588 9898, SE/VAT-nr: DK12553242, Bank: Danske Bank Lyngby, E-mail: info@kaj.dk; Reference Was Found Online at: http://www.optocleaner.com/18-Early%20Research.pdf.

* cited by examiner

*Primary Examiner* — Jack Berman
(74) *Attorney, Agent, or Firm* — Elting Patents and Technology LLC; Mark J. Elting

(57) ABSTRACT

Non soil-invasive four-parameter rapid unnatural dual component selective illumination protocol (UDCIP) for plant eradication using a process time under one minute. Application of a relatively low level of non-mutating UV-A optical energy to root crowns and/or soil grades allows below-ground UV-A penetration into soil to illuminate root crowns, and when preceded by or coincident with an above ground near-IR defoliation and root crown illumination step, results in an unexpected rise in lethality. Very high lethality, including 100 percent, is obtained using low deposited energy. UV-A optical energy can be delivered to root crowns and adjacent soil via a UV-transmissive knive blade.

20 Claims, 11 Drawing Sheets

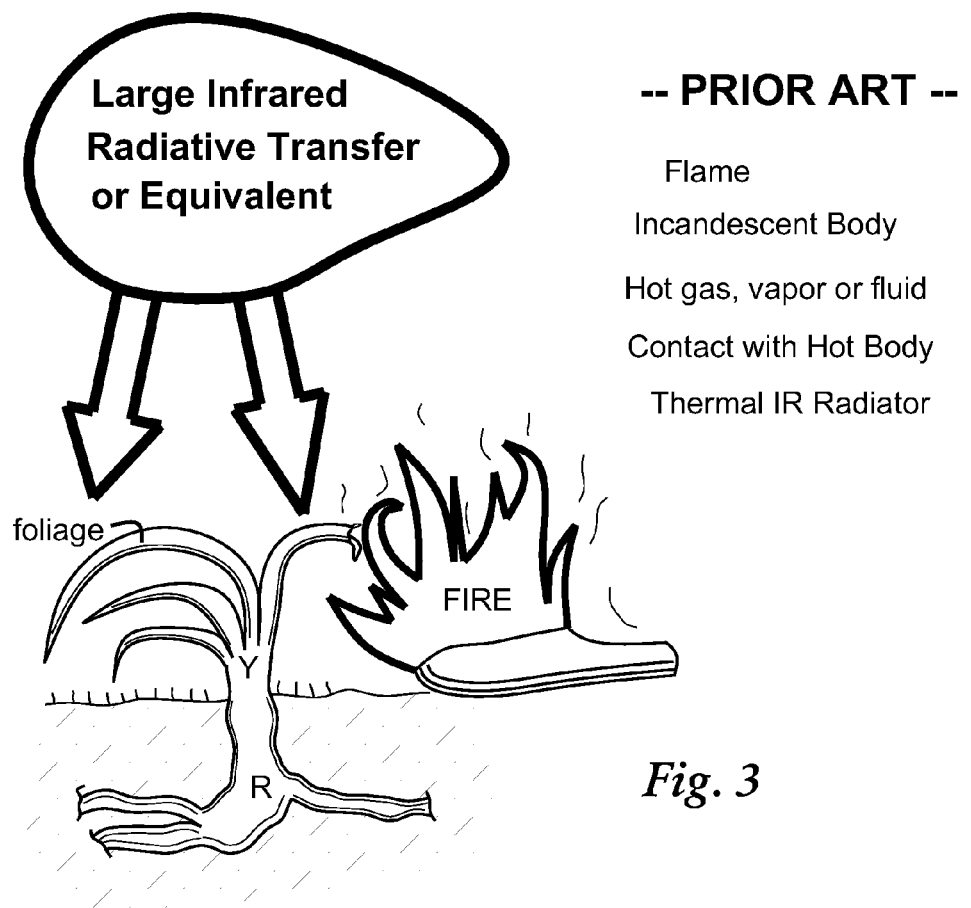
*Fig. 3*
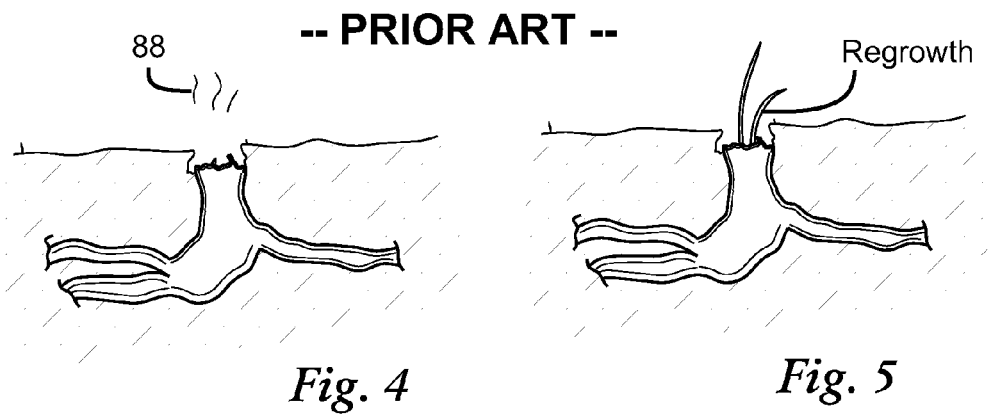
*Fig. 4*  *Fig. 5*

-- PRIOR ART --

Digitaria Sanguinalis

Large / Dangerous Radiative Transfer

Scalding  Burning  UV "Burn"

Energy Distribution High in UV-B and UV-C  -- PRIOR ART --

Leaf / Plant Component Failure  Dehydration  Fig. 9

*Fig. 17*
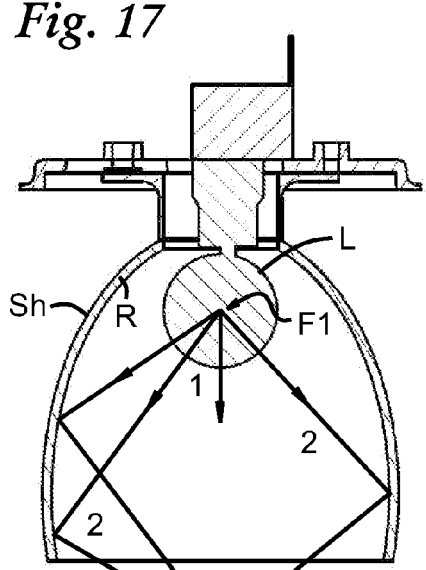
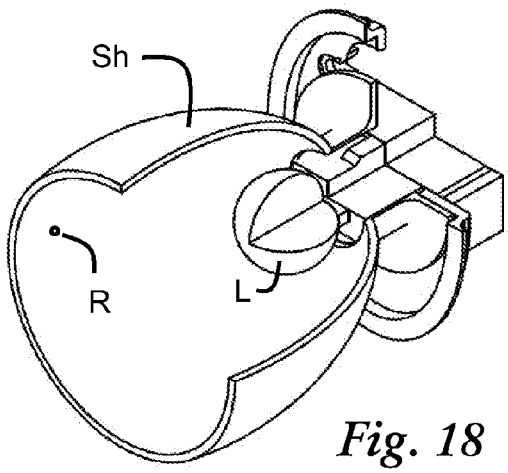
*Fig. 18*
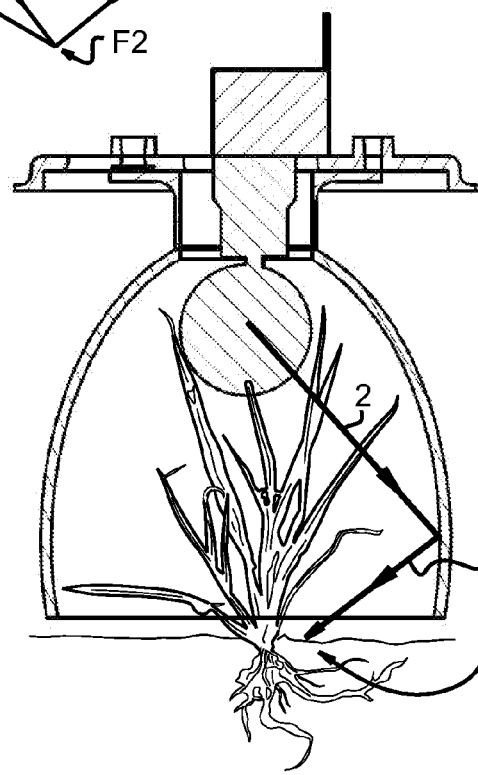
*Fig. 19*
Foliage Avoidance Ray
Soil grade immediately adjacent ROOT CROWN SOIL DISTURB
DIRECT UV-A DELIVERY
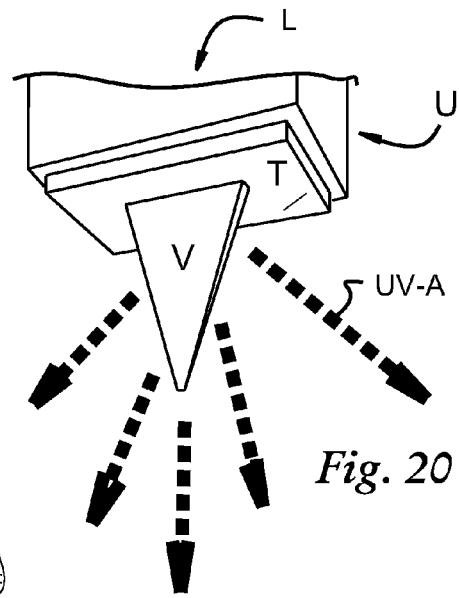
*Fig. 20*
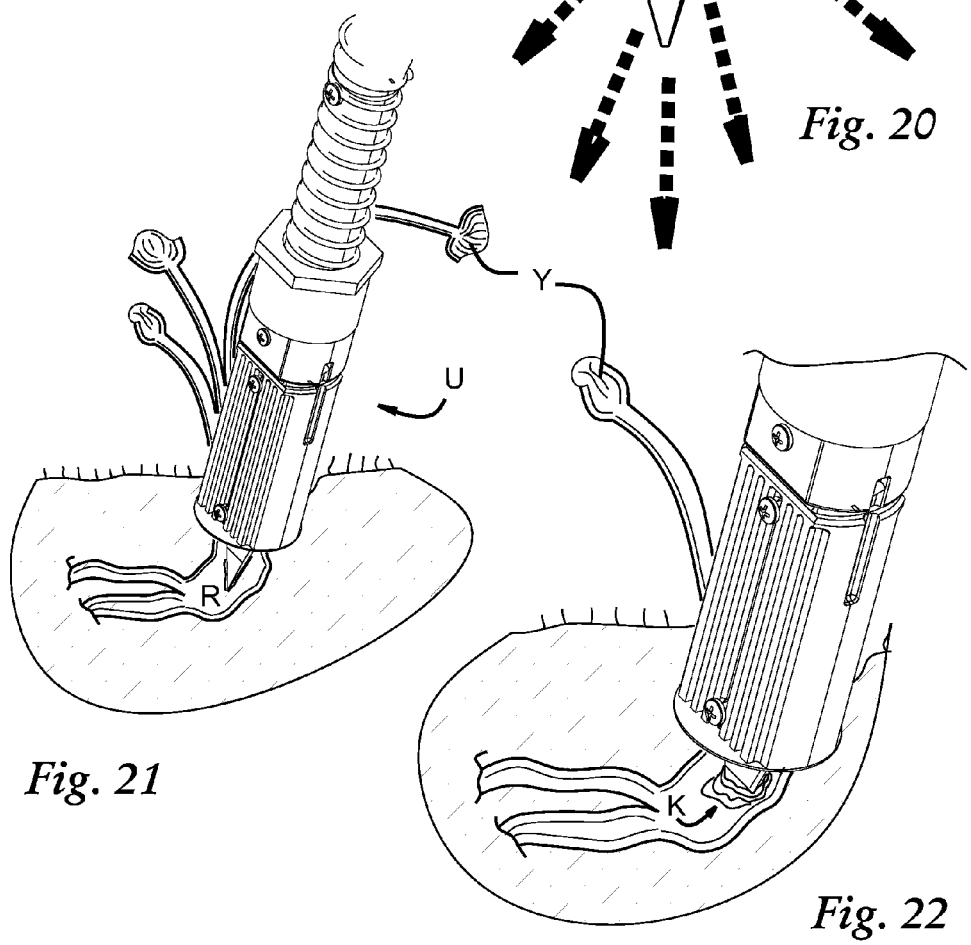
*Fig. 21*
*Fig. 22*

MACHINE RECOGNITION
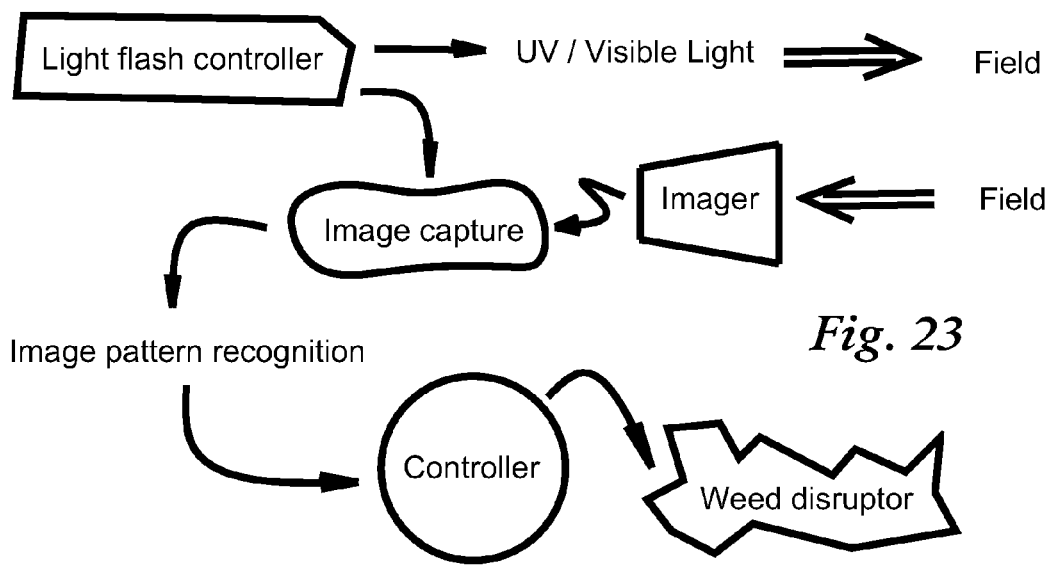
*Fig. 23*
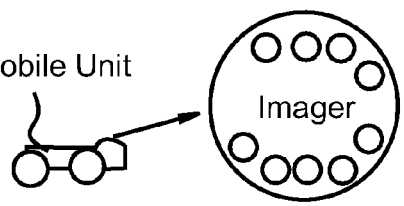
*Fig. 24*
*Fig. 25*
ADAPTIVE STRESS VECTORS
Forest Fire (above ground)
High Intensity unprecedented UV-A signaling at root crown / below soil grade
High velocity shift in illumination exposure levels

PLANT ERADICATION USING NON-MUTATING LOW ENERGY RAPID UNNATURAL DUAL COMPONENT ILLUMINATION PROTOCOL (RUDCIP) IN FOUR PARAMETERS

TECHNICAL FIELD

This invention relates to plant and weed control using illumination trauma and thermal trauma. More specifically, it relates to a relatively low energy rapid unnatural illumination protocol of duration less than one minute to induce plant death, by altering cellular metabolism, causing plant component damage, hormonal changes, damage to photosynthetic apparatus, and possible interruption of healthy symbiosis of a plant root with rhizosphere microorganisms surrounding the root. The invention does not use high radiative energy transfers for destruction by severe scalding, heat shock, incineration, or the like.

BACKGROUND OF THE INVENTION

In lawn care, groundskeeping and landscape care, there is a great need for plant or weed control without the application of herbicides or toxic substances.

Reducing the use of pesticides for weed and plant control has become an issue of national importance. Ground water is vitally important and the use of herbicides to prevent weeds from growing in homeowner and commercial lawns adversely impacts the quality of ground water. Most herbicides are persistent, soluble in water, and ingestion at high toxicity levels can be carcinogenic, affecting the human nervous system and causing endocrine disruption.

To protect water quality, simple removal methods not relying on pesticides are widely sought. Ninety-five percent of fresh water on earth is ground water. Ground water is found in natural rock formations called aquifers, and are a vital natural resource with many uses. Over 50% of the USA population relies on ground water as a source of drinking water, especially in rural areas.

In the USA, concerns about the potential impacts of herbicides on human health, as well as on terrestrial and aquatic ecosystems, have led to a wide range of monitoring and management programs by state and federal agencies, such as the U.S. Environmental Protection Agency (USEPA). For example, atrazine is a toxic, white, crystalline solid organic compound widely used as an herbicide for control of broadleaf and grassy weeds, and has been detected in concentrations problematic for human and animal health.

Mechanical and thermal phenomena marshaled against undesirable plants by prior art devices, methods and teachings are not effective overall, and this is due in large part to the natural robustness of plants, due to their physiology and responses to natural trauma. The role of repair, regrowth, and the beneficial effects of soil-borne microbes all play a role in the hardiness of plants to prior art thermal and mechanical methods for plant control.

Evaluation of effective methods for plant control using largely non-invasive phenomena is a difficult subject area to evaluate for general effectiveness because of many and varied biologic and environmental factors, including plant species, condition, type, environmental history, solar insolation, weather, and varied actions of insects, animals and microbiotica.

A key component for nearly all plants, including nuisance vegetation, is its root system. A typical root comprises various internal layers, including a xylem layer which operates essentially to transport water and provide, when needed, healing substances that repair wounds, such as burn wounds or severing, lacerations, and the like. Surrounding the xylem layer is a phloem layer, typically a living transport layer, which transports organic substances such as glucose and other sugars, amino acids and hormones. Surrounding phloem layer is a cortex, which is in turn surrounded by an epidermis, which acts like a skin which sheds dead cells.

In the immediate vicinity of the root of a plant, or on the root itself, is what is known as rhizospheric soil, which acts as a key root-soil interface of supreme importance for plant health. It is well known that soil-borne microbes interact with plant roots and soil constituents at this root-soil interface. This produces a dynamic environment of root-microbe interactions known as the rhizosphere, whose character and effect on the life of a plant varies widely with differing physical, chemical, and biological properties of the root-associated soil. Root-free soil without such organisms is known as bulk soil. Releasing of root exudates, such as epidermis flakes and other secretions, is sometimes called rhizodeposition and provides growth material, structural material or signals for root-associated microbiota. These microbiota feed on proteins and sugars released by roots. Protozoa and nematodes that feed on bacteria are also present in the rhizosphere, and provide nutrient cycling and disease suppression by warding off pathogens. [Ref: Oxford Journals Journal of Experimental Botany Volume 56, Number 417 Pp. 1761-1778, hereby incorporated in this disclosure in its entirety].

The balance of populations in a healthy symbiotic rhizosphere is important, because, in part, the bacteria which provide disease suppression interact with pathogens in a variety of ways, including mechanisms of antagonism, such as by competition for nutrients, parasitism, predation and antibiosis. Fungi, too, can be involved, and their actions, when turned from symbiotic to antagonistic, can be lethal for a plant.

There are three separate, but interacting, components recognized in the rhizosphere: the rhizospheric soil, the rhizoplane, and the root itself. The rhizosphere is soil influenced by roots via release of substances that affect microbial activity. The rhizoplane is the root surface, including the strongly adhering soil particles. The root itself also participates, because certain micro-organisms, known as endophytes, are able to colonize root tissues.

Any method to eradicate nuisance vegetation is typically influenced by the overall effect—and possible later influence—on the plant roots, and the rhizosheric soil. Interactions of a plant with electromagnetic radiation have been explored, but easy, safe, clean and efficient eradication meeting certain requirements has been heretofore elusive.

In this disclosure, the plant root crown, as discussed below, figures importantly.

In the prior art, basic thermal and mechanical techniques to eliminate nuisance vegetation are not sufficiently effective for use a commercially viable eradication program or system. This includes

[1] basic pulling of plant stems, roots, or other plant components to induce tensile failure, such as by natural events like feeding of cows and other ruminants;
[2] tensile failure below ground surface or soil grade;
[3] severing action or cut action, such as by gnawing or eating by an animal;
[4] cutting using a cutting tool or machine such as a chain saw;
[5] surface trauma delivered to plant root epidermis and cortex, such as lacerating or abrasion of the epidermis and possibly the cortex of a root, such as done by a gnawing animal, or by trauma delivered by a shovel blade or other tool; or

[6] needle wounds, which lend themselves to repair using latex or other healing substances that are dispatched to the scene of the wound, often originating from the xylem layer to transport needed enzymes and healing tars.

Biological responses to unnatural illumination can be counter-intuitive and complex, and there are many phenomenological findings discovered.

Now referring to FIG. 1, a schematic representation of a general electromagnetic spectrum for wavelengths of radiation of significance that are potentially incident upon a plant, with wavelengths ranging from 1 mm to less than 100 nm is shown. In the infrared portion, or heat radiation portion of the electromagnetic spectrum, the near-infrared, or near-IR, as it is commonly known, ranges in wavelength from 700 nm to 3 microns. Visible light is generally taken to range from 700 nm to 400 nm. Ultraviolet radiation is generally taken to be of wavelength less than 400 nm, with near-ultraviolet further divided into known portions UV-A (400–320 nm), UV-B (320–280 nm) and UV-C (280 nm–100 nm), which is extremely dangerous for humans and is often used as a germicidal radiation to purify water and kill bacteria, viruses, and other organisms.

Now referring to FIG. 2, a cartesian plot of both unfiltered solar radiation and net (ground) solar radiation is shown, with spectral radiance in watts per square meter per nanometer versus wavelength in nanometers (nm) is shown. Photosynthesis in plants makes use of visible light, especially blue and red visible light, and ultraviolet light, to varying degrees, depending on a host of factors including plant species and type, radiation exposure history and other factors. Approximately seven percent of the electromagnetic radiation emitted from the sun is in a UV range of about 200-400 nm wavelengths. As the solar radiation passes through the atmosphere, ultraviolet or UV radiation flux is reduced, allowing that UV-C ("shortwave") radiation (200-280 nm) is completely absorbed by atmospheric gases, while much of the UV-B radiation (280-320 nm) is additionally absorbed by stratospheric ozone, with a small amount transmitted to the Earth's surface. Solar UV-A radiation (320-400 nm) is essentially, for practical purposes, not absorbed by the ozone layer.

Plants tend to respond to UV-B irradiation by stimulating protection mechanisms or by activating repair mechanisms to reduce injury and perform repair.

A common protective mechanism against potentially damaging irradiation is the biosynthesis of UV absorbing compounds, which include secondary metabolites, mainly phenolic compounds, flavonoids, and hydroxycinnamate esters that accumulate in the vacuoles of epidermal cells in response to UV-B irradiation. These compounds attenuate UV-B range radiation and protect the inner or deeper cell layers, with little absorptive effect on visible light.

UV-B radiation is considered highly mutagenic, with plant DNA particularly sensitive. UV-B radiation causes phototransformations and can result in production of cyclobutane pyrimidine dimers (CPDs) and pyrimidine (6-4) pyrimidinone dimers (6-4 Pps). DNA and RNA polymerases are generally not able to read through these photoproducts and the elimination of these cytotoxic compounds is essential for DNA replication and transcription and for plant survival. (Britt and May, 2003). To cope, most plants have developed repair mechanisms including photoreactivation, excision, and recombination repair. Photoreactivation is a light-dependent enzymatic process using UV-A and blue light to monomerize pyrimidine dimers: Photolyase binds to the photoproducts and then uses light energy to initiate electron transfer to break the chemical bonds of the cyclobutane ring and restore integrity of the bases.

It is now known that plant roots also are simply generally sensitive to UV-B light levels, such as via the action of the gene RUS1, and can pass this information on to other parts of a plant responsible for growth and development. Low dosages of UV-B light can provide important signals to the rest of the plant and can be beneficial to plant growth, helping young plants develop in a timely way, and helping promote seedling morphogenesis. For long term exposure of weeks' duration, too much UV-B light can be toxic to some plants. However, any resulting lethality is not suited for meeting the purposes served by the instant invention, as discussed below.

The allelopathic behavior of plants can be influenced by exposure to added (artificial) UV-B radiation [ref: "Allelopathic Influence of Houndstongue (*Cynoglossum officinale*) and Its Modification by UV-B Radiation," Nancy H. Furness, Barbara Adomas, Qiujie Dai, Shixin Li, and Mahesh K. Upadhyaya; Weed Technology 2008 22:101-107].

Importantly, UV-B radiation can trigger biochemical steps to activate internals processes such as wax production to provide a plant with protection against further ultraviolet radiation [ref: "A UV-B-specific signaling component orchestrates plant UV protection," Brown B A, Cloix C, Jiang G H, Kaiserli E, Herzyk P, Kliebenstein D J, Jenkins G I; Proc Natl Acad Sci USA. 2005 Dec. 13; 102(50):18225-30. Epub 2005 Dec. 5]. Plant epidermal flavonoids can protect the photosynthetic apparatus from UVB-mediated damage [ref: "Protection of the D1 photosystem II reaction center protein from degradation in ultraviolet radiation following adaptation of *Brassica napus* L. to growth in ultraviolet-B," Wilson, M. I. and B. M. Greenberg (1993) Photochem. Photobiol. 57, 556-563] [ref: "A flavonoid mutant of barley (*Hordeum vulgare* L.) exhibits increased sensitivity to UV-B radiation in the primary leaf," Reuber, S., J. F. Bornman and G. Weissenbo"ck (1996) Plant Cell Environ. 19, 593-601].

Now referring to FIG. 3, a partial schematic representation of a class of prior art plant eradication using various large infrared radiative transfers is shown. A plant Y with root R is shown receiving a large infrared radiative transfer from a forest fire, or any number of prior art infrared radiation-producing processes listed as shown, such as via a flame, an incandescent body, a hot gas, vapor (e.g., steam) or fluid, or via contact with a hot body, or via exposure to known IR or infrared radiators.

Because of the their inherited ability to withstand forest fires and lightning strikes, most plants do not respond in large numbers to application of heat as given in the prior art. Application of thermal contactors or applicators have not met with success. The heat thus delivered is ineffective or can be beneficial or stimulative, with any resultant subsequent repair to a root often making the root more robust to future thermal trauma.

Application of thermal energy and high doses of radiant energy have been shown in the prior art to burn, incinerate, discolor, or render useless above-ground plant components. Whether or not those same plants grew back, however, is often left unstated in prior art disclosures.

FIG. 3, which shows schematically as an example a FIRE impinging upon plant Y and/or root R, is followed by FIG. 4 showing a burned root with a burned stump as shown, such as might be found after a forest fire, with combustion byproducts, volatilized proteins or smoke 88 rising from the stump as shown. Even obliterating plant Y above ground in this manner typically results in the response shown in FIG. 5, which shows Regrowth as shown.

It is not sufficient merely to damage certain components of a plant, such as above-surface foliage. While visible above-ground damage may be desirable for an operator of a eradication machine, actual lethality can be short of expectations and short of what is required for a successful eradication system.

For example, prior art U.S. Pat. No. 5,189,832 to Hoek et al., discloses gas-fired burners which are directed at nuisance vegetation along a ground plane. This and other prior art methods which burn or heat plant parts usually fail, because plants have evolved to tolerate—and sometimes be stimulated by, forest fires and lightning strikes.

Similarly, when propane and heated ceramics burn off foliage, root structure remains among plants, and many plants regrow. Soil is an excellent thermal insulator both because of the presence of what are essentially refractory materials such as silica, sand, igneous rock particles, and the like—and also because of air content, moisture content, and because of its thermal mass.

It has been found through experimentation that It takes approximately one hour for a 8000 btu/hour output propane torch to have significant thermal effects 2.5 cm into bulk soil. Common nuisance vegetation such as *Digitaris sanguinalis* in the crabgrass family, for example, is difficult to kill, regenerates easily after pulling, and is resistant to chemicals and thermal trauma.

Many weeds such as crabgrass are fairly transparent to UV-C and the lethality of UV-B for short term applications of low energy is small in degree and not sufficient for a commercially successfully eradication method.

Now referring to FIGS. 6 and 7, there is depicted one typical class of prior art eradication processes or occurrences whereby extreme ultraviolet light induced trauma is delivered with a large UV radiative transfer via general illumination or flash onto a naturally grown species *Digitaria sanguinalis* rooted into a soil grade as shown. The radiation shown in FIG. 6 is shown for illustrative purposes, ranging from visible light, through UV-A, UV-B and UV-C and beyond, into what is known as Far Ultraviolet, extremely virulent and dangerous forms of radiation.

First, it should be noted that with the various protection mechanisms that plants employ, added amounts of UV radiation are quite often ineffective, either wholly or in practice, for a suitable process. When plants are normally in sunlight, they tend to develop a waxy layer on their leaves and other similarly exposed components. These plants tend to be resistant to UV radiation. In particular, monocots and dicots have protective cells, including a well-developed epidermis which comprises a waxy layer on top, called the cuticle. This waxy surface protects the leaves from sunburn, dessication (drying out) and reduces attacks by fungi, bacteria, virus particles and insects. This layer prevents what is called sunscald.

When moderate levels of UV radiation are used to attempt to clear nuisance vegetation, leaves can turn white in color as the radiation breaks down connections of layers, and as a result, the leaf is unable to conduct photosynthesis. However, the root structure remains, and the plant usually is able to adapt as after a forest fire, which inflicts similar damage.

Evaluating the effect of artificial illumination on nuisance plants can be complex, with competing and conflicting effects and factors. Prior art techniques have not been successful, overall. In many cases, added illumination in the form of general UV rays containing UV-A, UV-B and UV-C frequencies has been found to give benefits. Inconsistencies in prior art research findings are due to differing plant biology and genetics; soil conditions; and ambient light, e.g., shady versus sunny conditions.

There are many engineering considerations that figure importantly in determining the success of an eradication system using illumination. Among the many other factors in play when using artificial illumination to attempt eradication of nuisance plants are:

[1] Actual operative (beneficial versus detrimental) result from illumination stress
[2] Effectiveness, such as expressed lethality in percent dead after 30 days
[3] Total required input energy
[4] Time of Exposure and speed of operations
[5] UV-A levels, UV-B levels, UV-C levels
[6] Lamp and system complexity, cost, the need for controls, ballasts, and safety guards
[7] Operator and bystander safety, specifically often the UV exposure danger. This is a significant disadvantage for prior art methods such as that disclosed in U.S. Pat. No. 5,929,455 to Jensen, which discloses an eradication method using high energy radiation, high in UV-B and especially UV-C radiation, which is dangerous and mutating. Jensen '455 uses very high applied power.
[8] Mutagenic effects from UV-B and UV-C to life forms at ground surface and into bulk soil. Although some mutagenic activity has been observed for even visible light, there is a steep exponential drop in mutagenic activity and effect for radiation over 320 nm wavelength.
[8] Ignition hazard and lamp unit operating temperatures A successful eradication system will develop and meet high benchmarks regarding these factors. While some effectiveness has been found using prior art methods, it has only been effective for very large and dangerous radiative transfers. The reason why these dangerous and very high energy transfers have been used is because prior art low energy methods have not worked.

The method described by Kaj Jensen in U.S. Pat. No. 5,929,455 uses an extremely high energy, dangerous process, specifically using UV-B and UV-C which have very high and special, qualitatively different, lethality. Interestingly, certain species such as crabgrass are fairly transparent to it for low dosages. Jensen '455 uses no other kind of light and employs a high pressure mercury (Hg) vapor lamp with a strong 254 nm UV-C emission line and no intervening phosphor. Such emissions, including similar emissions lines from other selected arc discharge lamps are very dangerous, expensive and require extensive controls and safeguards. Jensen '455 uses dosages very far greater than 10,000 joules per square meter merely to stop or retard growth dependent on the type and size of the plant. Actual lethality for a successful eradication process for the type of radiation Jensen '455 arrays is many tens of thousands of Joules per square meter exposure.

This type of high energy exposure of UV rays to kill life, including plant life, is known since at least the mid-20th century. During World War II and also during tests in decades after, it became known that certain high energy depositions of UV-B and UV-C radiation onto land kills vegetation—and it is energies in this regime, in terms of total Joules of deposited UV energy—that Jensen '455 uses.

The world's first hydrogen bomb test, conducted by the United States in the Bikini Atoll in March, 1954, had unprecedented explosive power, an equivalent explosive yield of as high as 15 Megatons of TNT (Trionitrotoluene). By contrast, the blasts at Hiroshima and Nagasaki in Japan in August, 1945 yielded an estimated 16,000 tons and 21,000 tons, respectively. Radiation effects from these blasts received very high attention and study.

According the Radiation Effects Research Foundation (RERF), a non-profit organization conducted in accord with an agreement between the governments of Japan and the United States, initial radiation effects were assessed by the Atomic Bomb Casualty Commission (ABCC) established in 1947, which was later re-organized into the RERF in 1975. This included extremely extensive and detailed epidemiological studies of health and longevity on more than 120,000 affected individuals, with research conducted for over fifty years. It also included detailed observations of effects on plants and animal life.

From the discoveries made after the bombing of Hiroshima and Nagasaki, regarding the effects on plant life from the measured emissions of electromagnetic (light) radiation, the application of a high amount of UV, including UV-A, UV-B and UV-C, to kill plants appears to be known. Generally, the energy of a typical atomic bomb is distributed roughly as 50% blast pressure, 35% as heat, and 15% as radiation (all types).

During the two atomic bomb blasts of 1945, the greatest number of radiation injuries was deemed to be due to ultraviolet rays. The origination of the ultraviolet rays comes from the extremely high temperature flash of the initial reaction in the detonated atomic bomb. These rays cause very severe flash burns and they were well known to have killed plant life. The radiation comes in two bursts: an extremely intense "flash" discharge lasting only 3 milliseconds, and a less intense one of longer duration, lasting several seconds. The second burst contains by far the larger fraction of total light energy, over ninety percent.

The first flash or discharge is especially rich in ultraviolet radiation, which is very biologically destructive. The total deposition energy of the initial flash alone is such that, with no time for heat dissipation, the temperature of a person's skin would have been raised 50 C by the flash of visible and ultraviolet rays in the first millisecond at a distance of just under 4000 meters from the blast zone.

This research was conducted by the Manhattan Atomic Bomb Investigating Group, formed on 11 Aug. 1945, two days after the bombing of Nagasaki, via a message from Major General Leslie R. Groves to Brigadier General Thomas F. Farrell. The biological effects of high amounts of UV radiation on plant life were especially obvious and pronounced by examining the aftermath of the first hydrogen bomb test on the Bikini Atoll.

Young naval officers on deck of the USS Bairoko witnessed, while in the Bikini Atoll about 50 km from the hydrogen bomb blast site, an intense flash followed by a longer radiation burst of some seconds duration, in turn followed by heavy, warm, blast-driven winds. The ultraviolet radiation from the flashes was sufficient to kill fish deep underwater, as evidenced by many varied fish floating to the surface, with bodies burned on one side or region, from incident UV rays. The ultraviolet radiation also killed plant life over a very large area. Various measurements were retained even though the blast destroyed many instruments that were set up in permanent buildings to measure it.

From the standpoint of acceptable lethality for a success eradication process, all low energy previous prior art techniques have fallen short and have not been acceptably effective. Speed of application and overall success rate are very important. Generally, the delivery of trauma which resembles natural trauma (e.g., severing, pulling, application of heat etc.) is not effective as bona fide reliable eradication methods, because the plants so treated tend to heal and regenerate, probably as a result of centuries of evolution. The delivery of illumination trauma in the low energy regime as attempted in the prior art is similarly not effective. Also, many prior art discoveries regarding application of artificial radiation to plants often exist ostensibly to serve another other objective, such as benefitting the plant, by removing pathogens or insects, etc.

SUMMARY OF THE INVENTION

A subtle but effective way to eradicate plants with optical and thermal/optical trauma with high effective lethality was discovered using unexpectedly low input energy and short exposure times using safe radiation. The invention uses aiming and a combination of irradiances not taught or suggested by the prior art.

The method includes a substantially non-invasive low-energy low irradiance non-mutating method for eradicating a plant in a time under one minute, using a Rapid Unnatural Dual Component Illumination Protocol (RUDCIP) with illumination about the plant, with the method comprising:

[1] An above-ground foliage and root crown damage illumination component comprising exposure to near-IR radiation directed to any of a foliage of the plant and a root crown of the plant, the near-IR radiation of irradiance $E_{near-IR}$ in W/m² and a total exposure time $T_{near-IR}$ in seconds following a RUDCIP Band (RUDCIP BAND) specification;

[2] A ground-penetrating UV-A illumination component, comprising exposure to UV-A radiation directed to any of a root crown of the plant and a soil grade immediately adjacent the root crown; the UV-A radiation of irradiance $E_{UV-A}$ in W/m² and a total exposure time $T_{UV-A}$ in seconds following the RUDCIP Band specification;

the above-ground foliage and root crown damage illumination component and the ground-penetrating UV-A illumination component each having the exposure times $T_{near-IR}$ and $T_{UV-A}$ of under one minute of total operation, respectively;

the RUDCIP Band specification comprising a Red River Crabgrass (*Digitaria cilaris*) protocol specification given by $$L=5.5\times10^{-6}[E_{near-IR}]*T_{near-IR}+6.5\times10^{-5}[E_{UV-A}]*T_{UV-A}$$

where L is lethality effectiveness expressed in fraction of plants dead in 30 days, such that L is greater than zero and equal to or less than unity:

the RUDCIP Band specification further specifying that the UV-A irradiance $E_{UV}$ is within a factor of three above or below the Red River Crabgrass (*Digitaria cilaris*) protocol specification, such that the UV-A radiation has an over-riding minimum irradiance $E_{UV-A}$ of 60 W/m²; and the RUDCIP band specifying further that the near-IR irradiance $E_{near-IR}$ between a maximum of 27,000 W/m² and a minimum of 270 W/m².

The method also can include shrouding the plant with a reflective shroud (Sh) to provide at least one foliage avoidance ray derived from the UV-A radiation, or using the shroud to perform any of a stab and a disturb of the soil grade, or using the shroud to shroud at least one plant leaf to avoid absorption block.

The above-ground foliage and root crown damage illumination component and the ground-penetrating UV-A illumination component can occur at least partially simultaneously, and total exposure times $T_{near-IR}$ and $T_{UV-A}$ can be of duration under 20 seconds, or under 5 seconds, or under 1 second.

Further, the exposure to UV-A radiation directed to any of a root crown of the plant and a soil grade immediately adjacent the root crown can be delivered via a UV-A transmissive knife blade (V).

Machine recognition can be used to locate the plant to be eradicated, and the method can be used to eradicate the plant so located.

Alternatively, subject to the same added features, the main method can include a substantially non-invasive low-energy low irradiance non-mutating method for eradicating a plant in a time under one minute, using a high velocity shift in illumination exposure levels to introduce an adaptive stress, the method comprising:

[1] Delivering an exposure directed to any of a root crown of the plant and a soil grade immediately adjacent the root crown, the exposure providing sufficient UV-A irradiance to allow UV-A exposure levels of at least 5 times a prevailing ambient UV-A exposure level for no longer than one minute of total operation, but no more than 14 kJ (kiloJoules) per square meter in total; and

[2] Delivering an exposure directed to any of foliage of the plant and the root crown, the exposure providing a near-IR irradiance $E_{near-IR}$ between a maximum of 27,000 W/m2 and a minimum of 270 W/m2 for no longer than one minute of total operation.

BRIEF DESCRIPTION OF THE DRAWINGS

FIG. 3 shows a partial schematic representation of a class of prior art plant eradication using various large infrared radiative transfers;

FIGS. 4 and 5 show partial cross sectional, partial surface views of a plant in soil, with a root structure in soil, with regrowth after a typical large infrared radiative transfer as depicted in FIG. 3;

FIG. 9 shows a listing of operative attributes for a class of prior art large UV radiative transfers as depicted in FIGS. 6, 7, and 8;

FIG. 17 shows a schematic cross sectional view of an elliptical reflector shroud configuration that can generate ray patterns helpful for practicing the instant invention;

FIG. 18 shows the elliptical reflector shroud configuration of FIG. 17 in oblique combination cross sectional and surface view;

FIG. 19 shows the schematic cross sectional view of the elliptical reflector shroud configuration of FIG. 17, with rays being directed upon a plant, and showing a foliage avoidance ray impinging upon a soil grade immediately adjacent a root crown of the plant;

FIG. 20 shows an oblique view of a partially schematic stab unit of an invasive hot stab plant eradicator as disclosed in U.S. Pat. Nos. 7,954,276 and 8,141,292, modified to provide emission of UV-A radiation;

FIGS. 21 and 22 show using part surface, part schematic views the stab unit of FIG. 20, inducing a hot or cold stab gash wound upon a plant root, with direct emission of UV-A radiation into a root of the plant, below soil grade;

FIG. 23 shows a schematic series of apparatus and process components for using the teachings of the instant invention with machine recognition and automated processes;

FIG. 24 shows a schematic representation of a mobile unit of the machine recognition embodiment depicted in FIG. 23, showing communication to an imager;

FIG. 25 shows a listing of possible adaptive stress vectors upon a plant which can arise while practicing the instant invention.

DEFINITIONS

Figure 1:
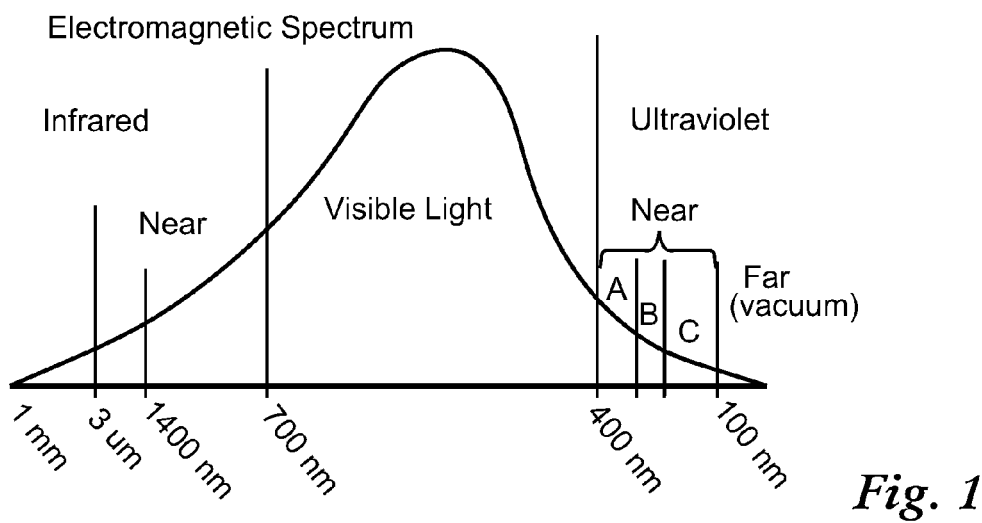
FIG. 1 shows a schematic representation of a general electromagnetic spectrum for wavelengths potentially incident upon a plant, with wavelengths ranging from 1 mm to less than 100 nm.
Figure 2:
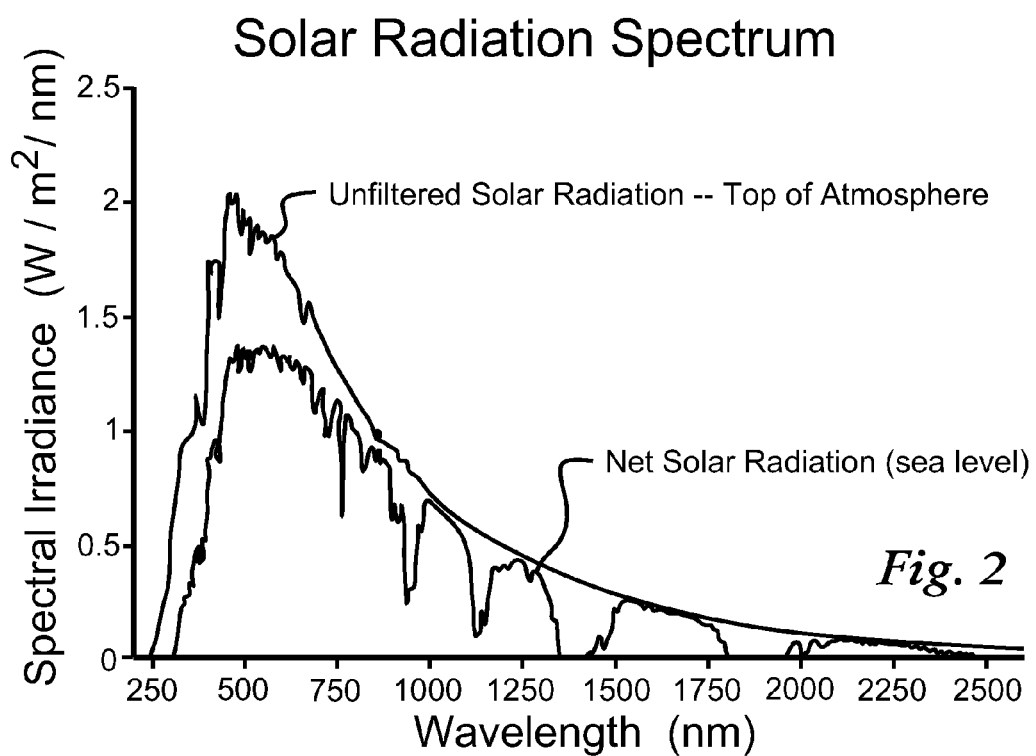
FIG. 2 shows a typical natural filtered and unfiltered solar radiation spectrum using a cartesian plot of spectral radiance versus wavelength.

The following definitions shall be used throughout:

Exposure—shall be that due to radiative transfer over and above that provided by natural sunlight or equivalent ambient light received by plants.

Exposure to near-IR radiation—shall be taken to include (such as in the appended claims) any equivalent output from a thermal RI radiator as defined in this section.

Foliage—shall denote all parts of a plant above soil grade, generally excluding root structures, and shall include components such as stems and leaves.

Heating—shall include all forms of energy or processes that produce heat, such as use of steam, microwaves, or light, including infra-red light.

Illumination—shall be interpreted broadly and shall include all manner of radiative processes as defined by the appended claims, and shall not be limited to lamp outputs, but rather shall encompass any and all radiation afforded by physical processes such as incandescence or any light emission process; flames; or incandescence from hot masses, such as gases, fluids, steam, metal knives or hot infra-red light radiators—and can encompass multiple sources.

Minute of total operation—"under one minute of total operation" shall include stepwise, piecemeal, segmented, separated, or modulated exposures that when totaled, have a summed duration or the equivalent of under one minute, such as four 10-second exposures/flashes over a three minute time. This last type of exposure is not preferred but is possible.

Near-IR—shall be defined by a melding of the International Commission on Illumination (CIE) classification and the scheme as given by ISO standard 20473, and shall extend from 700 nm to 3 microns (3000 nm) wavelength, and can be produced using a lamp, filament, bulk incandescent source or other source as discussed herein.

Non-invasive—shall include the attributes of not requiring uprooting, stabbing, cutting, striking or significant mechanical stressing, except for contact with hot bodies or hot fluids such as hot gases or steam when used as a thermal equivalent of general IR (infrared) radiation as taught here.

Non-mutating—shall be construed as relatively non-mutating, such as UV-A radiation being relatively non-mutating when compared to the effect of UV-B radiation.

Rhizosphere—shall include all microorganisms in contact with, in the vicinity of, or interacting with a plant root system, such as nitrogen-fixing bacteria, fungi, and mycorrhizae, such as arbuscular mycorrhizae which can inhabit root structure.

Root—can comprise any number of root types, such as a tap root, a fibrous root, a prop root, an aeria root, an aerating or knee root, a buttress root, or a tuberous root system.

Root crown—shall comprise the portion of a plant root which is above, at, or near the surface established by a soil grade. This shall include the root collar or root neck from which a plant stem arises.

RUDCIP Band—shall be taken to be a flexible estimated specification as an expression of the manner of extracting the most benefit from the inventive concepts disclosed, taught and claimed. The RUDCIP Band specification is approximate, established as a fit with a preponderance of data from application of the methods of the invention to produce a desired 30-day lethality in a model plant, Red River Crabgrass (*Digitaria cilaris*) as described in the specification.

Soil grade—shall include any prevailing soil grade, or any immediately effective soil grade, such as after disturbing of soil.

Thermal IR radiator—shall include any flame; incandescent body or glowing filament; any hot gas, vapor (e.g., steam) or fluid; and shall include contact with hot bodies and anything which operates as a thermal IR (infrared) radiator.

UV-A radiation—for the purposes of the appended claims, shall denote ultraviolet radiation of wavelength from 300-400 nm.

DETAILED DESCRIPTION

Figure 6:
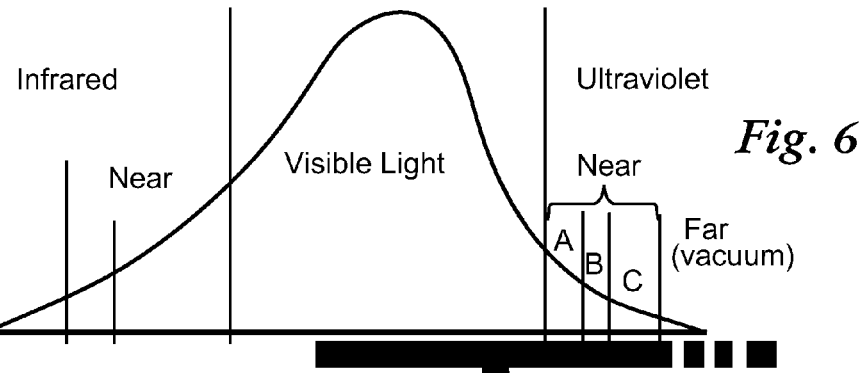
FIGS. 6 and 7 show together one typical class of prior art eradication processes or occurrences whereby extreme ultraviolet light induced trauma is delivered with a large UV radiative transfer via general illumination or flash onto a naturally grown species *Digitaria sanguinalis* rooted into a soil grade.
Figure 7:
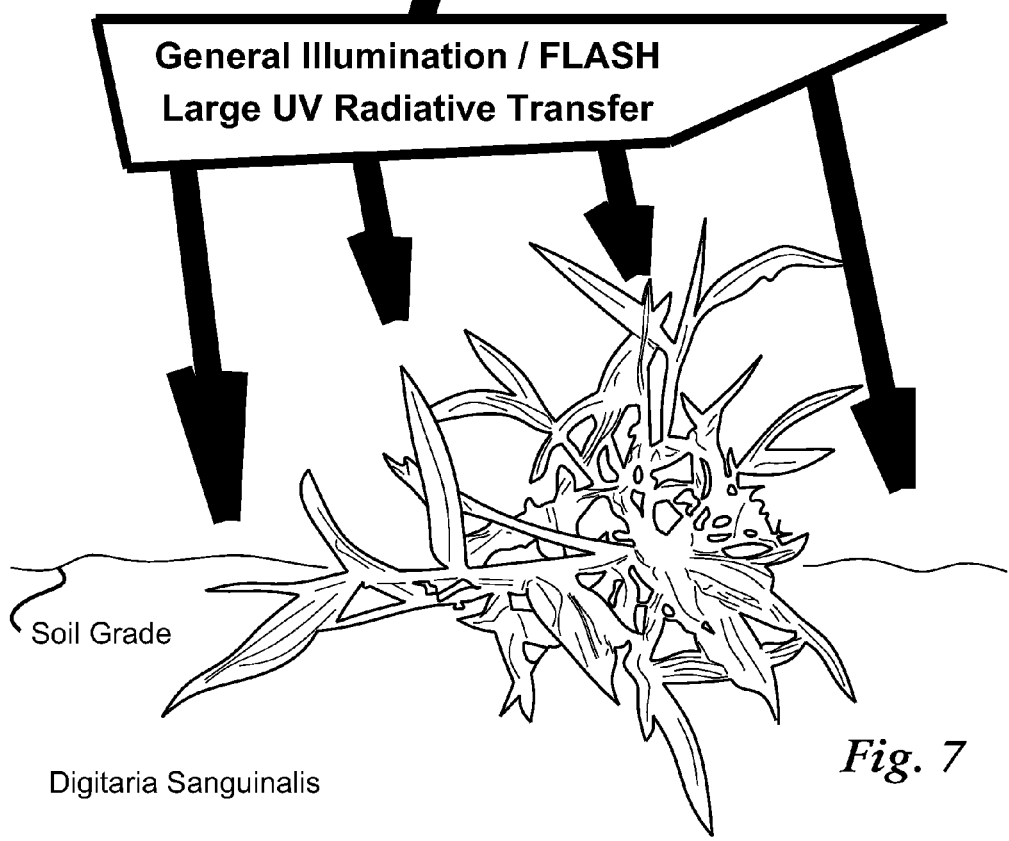
Figure 8:
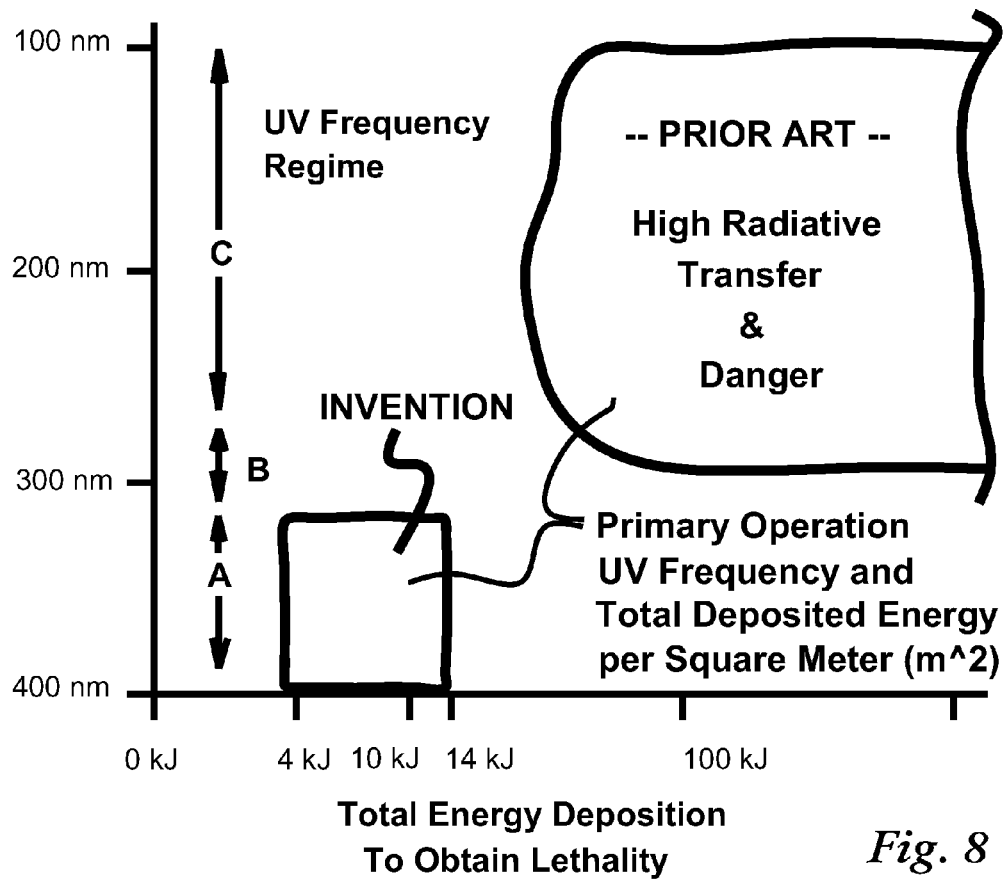
FIG. 8 shows a cartesian plot representation of UV frequency regimes and total deposited energy regimes for the high radiative transfer depicted in FIGS. 6 and 7, with contrast to a typical regime of operation for the instant invention.

Now referring to FIG. 8, a cartesian plot representation of UV frequency regimes and total deposited energy regimes is shown for the high radiative transfer depicted in FIGS. 6 and 7, and with contrast shown to a typical energy and frequency regime of operation for the instant invention. As shown on the plot, prior art high radiative transfers use frequencies in the UV-B and UV-C (germicidal) regimes, with energies well in excess of 25 kJ (25,000 ioules) per square meter, such as 30,000 to 1,000,000 joules per square meter. As shown, the instant invention is in a different regime, operating using, in part, ultraviolet radiation in the UV-A frequency range, typically 320 nm to 400 nm, but possibly extending to 300 nm (not shown). This separate regime comes about via the method to be described. Total energy deposition for the method of the invention ranges from just under 4 kJ to 14 kJ.

Now referring to FIG. 9, a listing of operative attributes for a class of prior art large UV radiative transfers as depicted in FIGS. 6, 7, and 8, specifically, the use of energy distributions high in UV-B and UV-C radiation—and effects on plant life, such as scalding, burning, an ultraviolet burn similar to extreme sun burn in humans called UV burn, leaf and plant component failure and dehydration.

Figure 10:
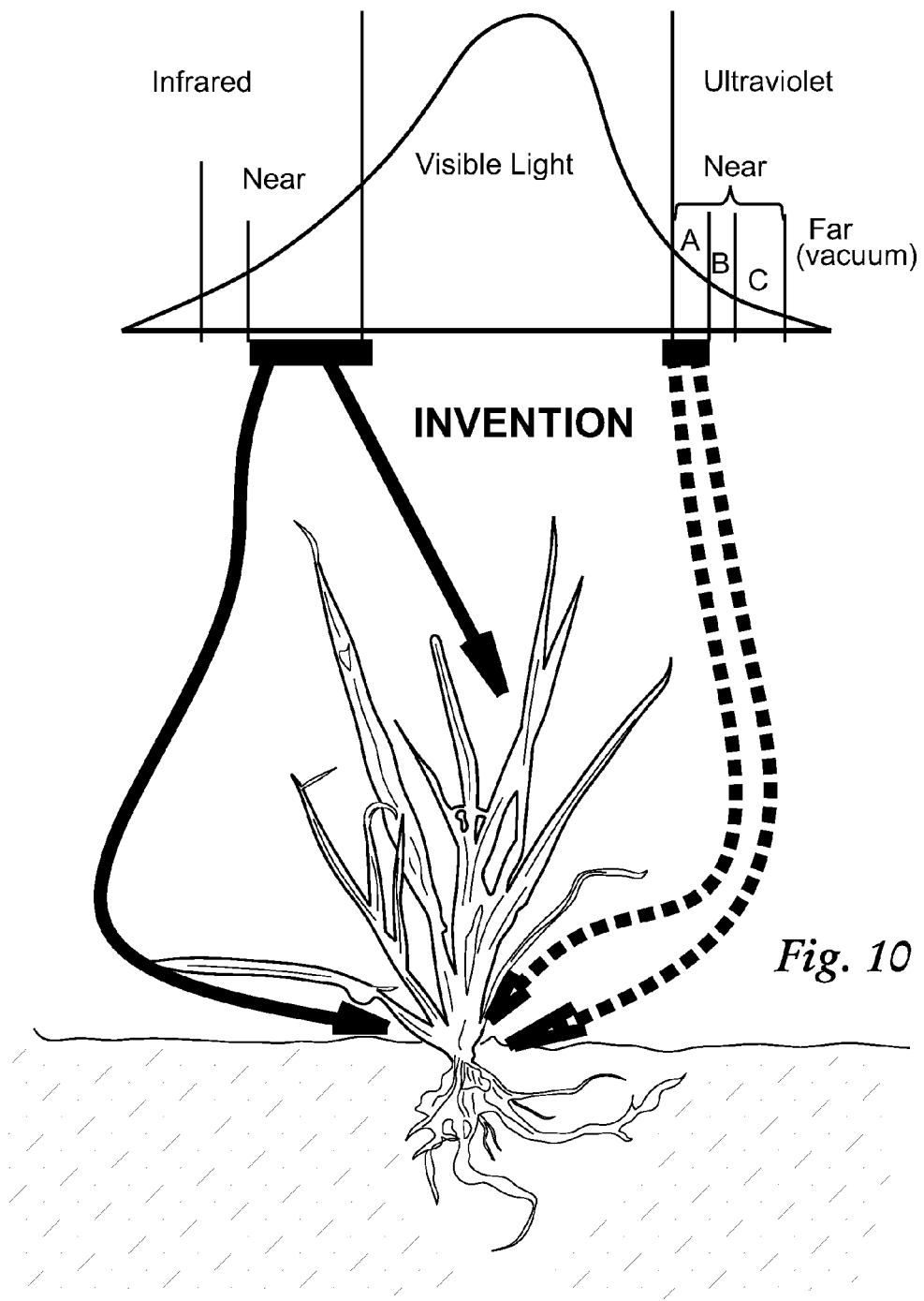
FIG. 10 shows a schematic representation of a typical eradication process according to the instant invention, with a dual component illumination protocol shown schematically for two portions of the electromagnetic spectrum as shown in FIG. 1 being directed upon parts of a plant (*Digitaria cilaris*) resting upon a soil grade.

Now referring to FIG. 10, a schematic representation of a typical eradication process according to the instant invention is shown. A dual component illumination protocol is shown schematically for two portions of the electromagnetic spectrum as shown in FIG. 1 being directed upon parts of a plant (*Digitaria cilaris*) resting upon a soil grade. The method comprises a substantially non-invasive low-energy low irradiance non-mutating method for eradicating a plant in a time under one minute.

Described very briefly and qualitatively, the method uses a Rapid Unnatural Dual Component Illumination Protocol (RUDCIP) with illumination about the plant. The method comprises

[1] an above-ground foliage and root crown damage illumination component comprising near-IR radiation directed to the foliage and/or the root crown of a plant, with representative near-IR rays as shown by solid arrows in the Figure; and

[2] A ground-penetrating UV-A illumination component, with dashed rays as shown, comprising UV-A radiation directed to the root crown and/or a soil grade immediately adjacent the root crown, with representative UV-A rays as shown by dashed arrows in the Figure. Both exposures are of under one minute duration, and preferably under 20 seconds, and most preferably in the range of ½-15 seconds.

Figure 11:
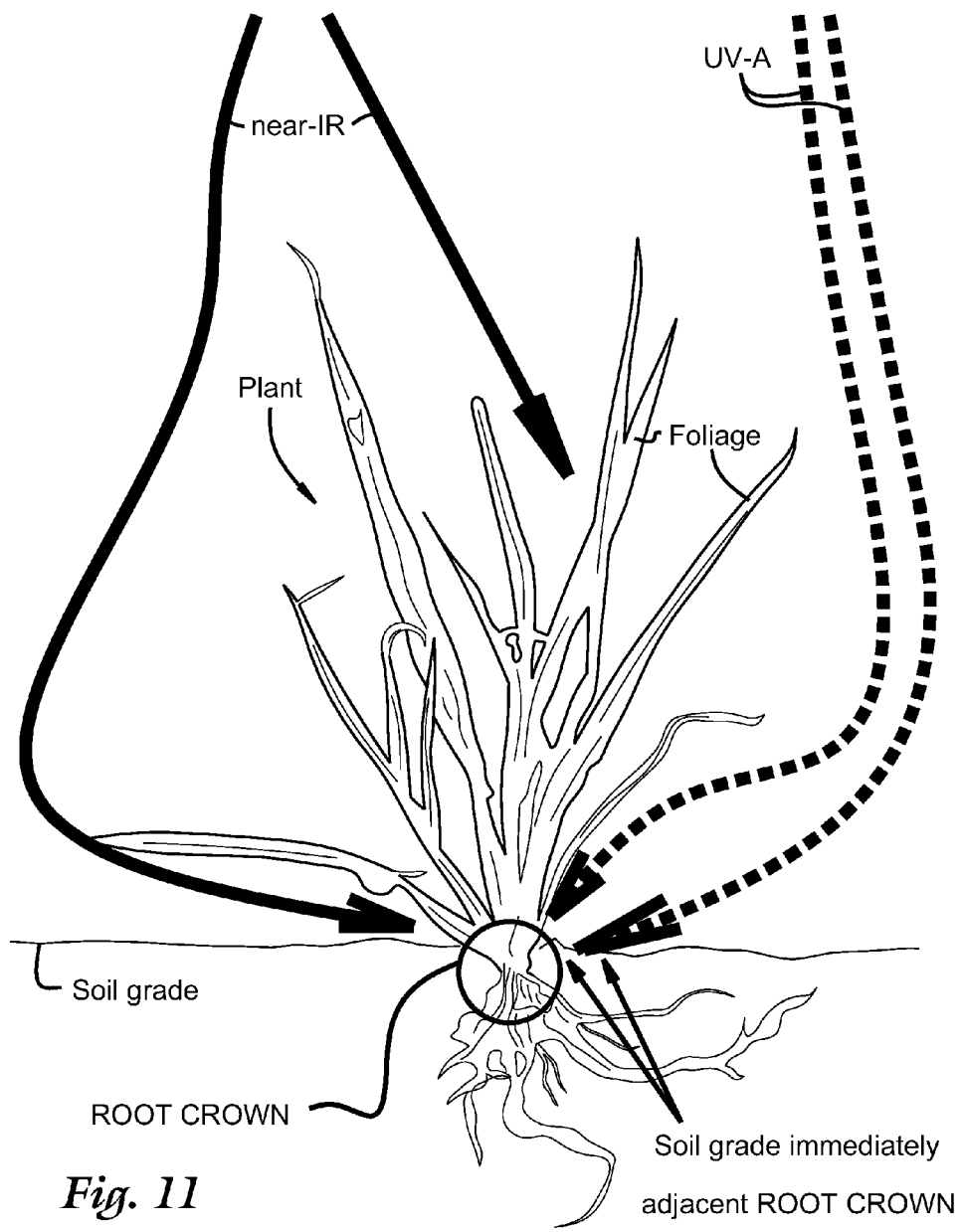
FIG. 11 shows a close-up view of the bottom portion of FIG. 10, showing incident near-IR and UV-A rays impinging upon the plant in specific ways, and showing plant foliage, the plant root crown and a soil grade immediately adjacent the root crown.

Now referring to FIG. 11, a close-up view of the bottom portion of FIG. 10 is shown. Near-IR rays (solid arrows) are shown directed upon the foliage and/or a root crown of a plant (e.g., *Digitaria cilaris*), while UV-A rays (dashed arrows) are shown directed to the root crown and/or a soil grade immediately adjacent same (shown). The root crown is shown inside the circled area.

The ground penetrating UV-A illumination component, when directed to a soil grade immediately adjacent the root crown, typically shows a penetration of the UV-A rays of 50% penetration at approximately 6 mm depth into soil. This targeted and specifically directed use of UV-A rays is very important and represents a departure from the prior art. The method discovered provides very effective lethality, an unanticipated finding.

It is interesting to note that root-crown temperature has been found to affect plant growth and physiology in various ways. Root crowns need to be exposed for oxygen and gas interchange. Further, a number of pests and diseases affect specifically this part of the plant, including root-crown rot/fungus and various species of root-crown weevil. The root crown area can appear swollen, tapered, constricted or very thin—as well as a combination of these. The root crown is usually located around or at the soil level and can be vaguely or clearly apparent.

Figure 12:
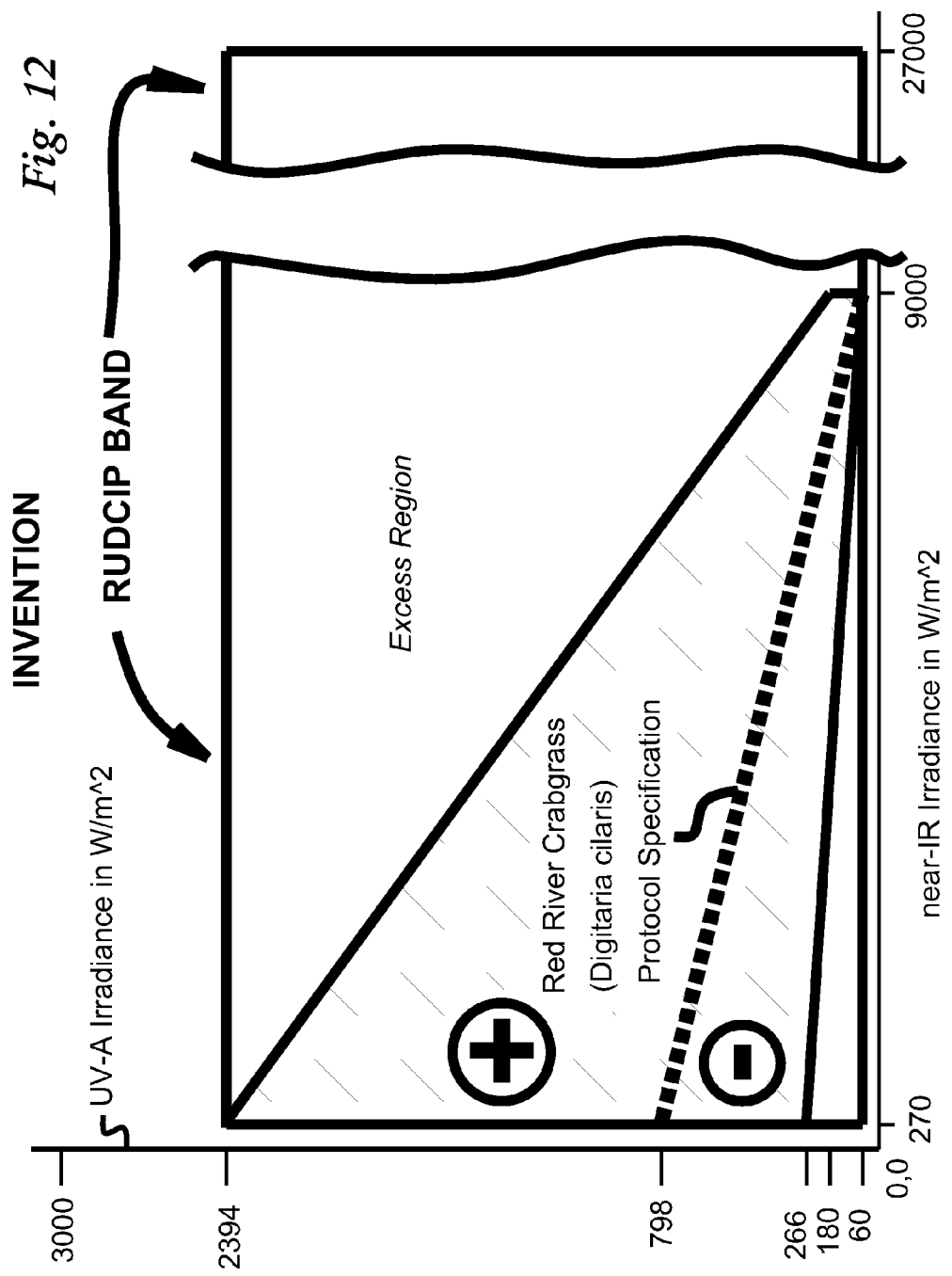
FIG. 12 shows a schematic cartesian plot representation of a RUDCIP (Rapid Unnatural Dual Component Illumination Protocol) Band of the instant invention, showing UV-A irradiance and near-IR irradiance levels which constitute the Band, and including a Red River Crabgrass (*Digitaria cilaris*) protocol specification inside the Band.

Now referring to FIG. 12, a schematic cartesian plot representation of an illustrative quantitative specification called a RUDCIP (Rapid Unnatural Dual Component Illumination Protocol) Band for use in practicing the invention is shown. The RUDCIP Band has been discovered to specify, in essence and in practice, actual required exposure levels for the near-IR and UV-A exposures as directed, including exposure times, that achieve a nominal result for actual plant lethality.

Specifically, the above-ground foliage and root crown damage illumination component that comprises near-IR radiation directed to the foliage and/or the root crown of the plant is specified to be of irradiance $E_{near-IR}$ in W/m$^2$ and has a duration for an exposure time $T_{near-IR}$ in seconds and follows the RUDCIP Band (RUDCIP BAND) specification.

Similarly, the ground-penetrating UV-A illumination component, that comprises UV-A radiation directed to the root crown and/or a soil grade immediately adjacent the root crown is specified to be of irradiance $E_{UV-A}$ in W/m$^2$ and has a duration for an time of exposure $T_{UV-A}$ in seconds and follows the RUDCIP Band specification.

Both the exposure times for the above-ground foliage and root crown damage illumination component and the ground-penetrating UV-A illumination component each have the exposure times $T_{near-IR}$ and $T_{UV-A}$ of under one minute, respectively.

The RUDCIP Band specification was generated by a preponderance of data obtained empirically by experiments upon a specific plant species known for difficulty in eradication and control, one notably being Red River Crabgrass (*Digitaria cilaris*). The RUDCIP Band specification is formed based upon a specific protocol specification, that is, it is formed using a Red River Crabgrass (*Digitaria cilaris*) protocol specification as a estimated and approximate basis or starting specification, given by the following four parameter relation or fit:

$$L = 5.5 \times 10^{-6} [E_{near-IR}] * T_{near-IR} + 6.5 \times 10^{-5} [E_{UV-A}] * T_{UV-A} \quad \text{Equation 1}$$

where L is unitless nominal lethality effectiveness expressed in fraction of plants dead in 30 days, such that L is greater than zero and equal to or less than unity. Values greater than one represent over-driven states that might be beneficial in insuring a desired lethality result.

This Red River Crabgrass (*Digitaria cilaris*) protocol specification was drawn up as evidenced by data after having made discovery of the unanticipated effectiveness of the invention.

FIG. 12 shows merely one illustrative example for a lethality of eighty percent, and using exposure times of fifteen seconds. Required UV-A irradiance and near-IR irradiance levels as shown on the ordinate and abscissa, respectively. The RUDCIP Band is specified starting with the Red River Crabgrass (*Digitaria cilaris*) protocol specification inside the Band, as shown by the dashed heavy line. This special line is a projection established by empirical data and given by above Equation 1.

Because actual lethality and desired radiation levels can depart substantially from this Red River Crabgrass (*Digitaria cilaris*) protocol specification, for illustrative reasons discussed below, the RUDCIP Band specification specifies further that the UV-A irradiance $E_{UV-}$ be within a factor of three above or below the Red River Crabgrass (*Digitaria cilaris*) protocol specification. This plus or minus factor of three is an important part of the protocol is and shown in the shaded regions labeled with large plus and minus signs (shown +/−).

As part of the RUDCIP Band specification, the UV-A radiation has an over-riding minimum irradiance $E_{UV-A}$ of 60 W/m² and the RUDCIP Band specification specifies further that the near-IR irradiance $E_{near-IR}$ be between a maximum of 27,000 W/m² and a minimum of 270 W/m² as shown by the overall large rectangular block in the Figure. The RUDCIP Band block shows UV-A radiation irradiance $E_{UV-A}$ ranging from 60 W/m² to 2394 W/m², and near-IR radiation irradiance $E_{near-IR}$ ranging from 270 W/m² to 27,000 W/m². There are in theory an infinite number of RUDCIP Bands, and the one depicted shows exposures needed for eighty percent lethality and for a fifteen second exposure time for both near-IR and UV-A plant exposures. These two exposure times do not have to be the same, as evidenced by the relation in Equation 1.

The higher near-IR exposure levels in the Excess Region as shown are those that can be elected and generally are not needed to achieve a chosen nominal lethality.

Regarding the "+/−" factor of three up or down from the Red River Crabgrass (*Digitaria cilaris*) protocol specification dotted line as shown in the Figure, there are many possible factors which would require a practitioner of the method of the invention to depart from the nominal Red River Crabgrass (*Digitaria cilaris*) protocol specification, such as the varied effectiveness of the invention on many varied different plant species; plant environmental history, plant health, prior sun exposure, history of rain or water uptake, degree of past built-up plant protection, such as waxy layers on leaves and other physiological changes; rhizospheric and bulk soil UV-A transmissivity; miscellaneous species factors; plant condition; soil factors; special rhizospheric factors such as symbiotic effect of macrobiotica; plant life cycle/stage factors such as whether the plants to be eliminated are in early growth stage, maturity, giving off seeds, etc.; the presence of ground debris which might block UV-A radiation from root crowns and nearby soil grade; and geographic location and climate, including average historical ambient UV levels.

As mentioned above, the RUDCIP Band specification shown is only merely illustrative of an infinite number of possible bands for different lethalities L. "Over-driven" states are possible where excess exposures are used for good measure to insure results, such as near-IR exposures in excess of what is called for, so long as total deposited energy in the UV-A spectrum is less than 14 kJ in total (not shown in Figure).

The combination of the targeted near-IR exposure to foliage and/or root crowns and the UV-A exposure to root crowns and/or the soil immediately adjacent root crowns provides unexpected results that are a departure from what was known previously.

During extensive testing on plants, the near-IR radiation step often caused what is known as dieback, which removes leaves from a plant. The combination of the two components of the protocol of the invention, in tests using 20 second exposures, 100% die-back with 0% re-growth was obtained using a various points on a Red River Crabgrass (*Digitaria cilaris*) protocol specification line. Testing was successfully completed for trials of various durations, including 5, 10, 15, and 20 seconds. The method is effective, with actual lethality with no regrowth later.

When a plant dies, it can be a complex process. Oxygen uptakes levels typically start to plummet, certain hormone levels go up, and the death process overall in the field of botany is not particularly well known. However, plants undergoing testing died as given by the protocol, with the statistical outliers that can be expected from any natural interaction. In a group of 100 plants, occasionally one plant would take as much as 2 weeks to die. Lethality as defined by a dead-in-thirty-days specification was chosen for this reason. During testing, immediate dieback was an observable, but death cannot be and was not often ascertained immediately.

The experimental efforts involved exposing Red River Crabgrass (*Digitaria cilaris*) to varying levels of UVA and long wave IR light, with different areas targeted. *Digitaria cilaris* is among the most common weed in turf, along with *Digitaria sanguinalis*, and is considered very difficult to eradicate. In tests two different soil samples were used—clay and a metromix rich in nutrients. The clay and metromix have differing mechanical and UV transmissive properties. An average of 4 to 5 seeds were placed in pots and a minimum of 25 pots constituted a sample unit. The density of planted seeds was chosen with extra caution to insure less competition among the seedlings as they grew. Since crabgrass seeds have relatively long periods of germination, experimentation did not start until four weeks after the seeds were planted. During this period the seeds were exposed to favorable environmental conditions, with adequate sun light and regular watering. The seedlings looked healthy, strong and averaged about 5 cm in length. Different levels of exposure were created using various lamps and reflector arrangements at differing distances from the soil grade. Instruments such as the Dymax® Accu-Cal® 50 meter was used to measure the UVA irradiances and an Ohn® meter, was used to measure the IR levels that were used, along with exposure times in seconds. One month later, under strict conditions with control groups, the percentage of achieved lethality was observed and recorded.

The dual component exposures according to the invention may be simultaneous, or partially simultaneous, and individually may be paused, stepwise or otherwise modulated. For example, a series of exposures or flashes can be used to achieve the method taught here, but the sum or equivalent summation of active exposures is under one minute of total operation, as described in the appended claims. All total respective exposure times can total under 20 seconds, preferably; or more preferably, under 5 seconds, or more preferably, under one second.

Preferred embodiments for the methods of the invention include properly targeted exposures where the near-IR irradiance $E_{near-IR}$ included a minimum of least 3 (three) suns, and UV-A irradiance $E_{UV-A}$ of a minimum of 5 (five) suns, where a sun is the approximate maximum ground level insolation at the equator, and for exposure times of 15-20 seconds respectively. The following data examples were obtained using a unitary light source, with identical effective monolithic exposure times for both near-IR and UV-A, with appropriate targeting of the radiations, and with experimental results given under Empirical Lethality:

Data Example 1

Time 20 seconds
near-IR irradiance 1654 W/m$^2$
UV-A irradiance 140 W/m$^2$
Empirical Lethality 0.5 or 50%
RRC protocol specification nominal lethality L=0.36

Data Example 2

Time 20 seconds
near-IR irradiance 4300 W/m$^2$
UV-A irradiance 430 W/m$^2$
Empirical Lethality 1.0 or 100%
RRC protocol specification nominal lethality L=1.03 (over-driven)

Data Example 3

Time 20 seconds
near-IR irradiance 8600 W/m$^2$
UV-A irradiance 100 W/m$^2$
Empirical Lethality 0.99 or 99%
RRC protocol specification nominal lethality L=1.08 (over-driven)

Data Example 4

Time 20 seconds
near-IR irradiance 1654 W/m$^2$
UV-A irradiance 60 W/m$^2$
Empirical Lethality 0.31 or 31%
RRC protocol specification nominal lethality L=0.26

Data Example 5

Time 10 seconds
near-IR irradiance 16000 W/m$^2$
UV-A irradiance 60 W/m$^2$
Empirical Lethality 0.99 or 99%
RRC protocol specification nominal lethality L=0.92

The method as represented by Data Example 2 is preferred and a best mode of practicing the invention. Over-driven states, such as from Data Examples 2 and 3, are a useful option for practicing the invention to insure lethality, especially among a mix of different species, or for conditions that might reduce net lethality, such as well-rooted plants, or the presence of ground debris which might reduce UV-A fluence into root crowns and the soil grade. The +/– factor of three as shown in FIG. 12 that is part of the RUDCIP Band specification is intended to cover variables of this type.

Another preferred embodiment of the invention comprises a substantially non-invasive low-energy low irradiance non-mutating method for eradicating a plant in a time under one minute, using a high velocity shift in illumination exposure levels to introduce adaptive stress, where the method does not refer to the RUDCIP Band specification, but rather, the method comprises delivering an exposure directed to any of a root crown of said plant and a soil grade immediately adjacent said root crown, with the exposure providing sufficient UV-A irradiance to allow UV-A exposure levels of at least 5 times a prevailing ambient UV-A exposure level (such as local average peak sunlight levels) for no longer than one minute of total operation, but no more than 14 kJ (kiloJoules) per square meter in total; and also delivering an exposure directed to any of foliage of said plant and said root crown, with the exposure providing a near-IR irradiance $E_{near-IR}$ between a maximum of 27,000 W/m2 and a minimum of 270 W/m2 for no longer than one minute of total operation.

The method of the invention allows for many different possible lighting and beam forming configurations. Beam forming and reflector-endowed lamp sets can be devised to allow both [1] the above-ground foliage and root crown damage illumination component that directs near-IR radiation to the foliage and/or the root crown of a plant, and [2] the ground-penetrating UV-A illumination component that directs UV-A radiation directed to the root crown and/or a soil grade immediately adjacent the root crown, to happen or operate simultaneously, and often with the same general lamp or photo-emissive device.

Figure 13:
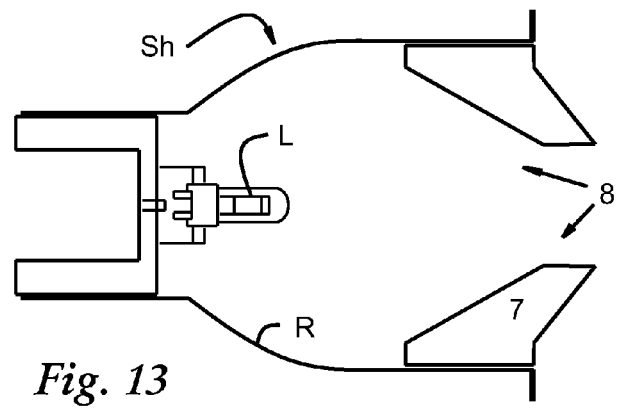
FIGS. 13-16 show various schematic cross-sectional shrouded lamp and reflector configurations that may be used to practice some embodiments of the instant invention, with irradiation adjacent a soil grade onto the plant as depicted in FIGS. 10 and 11.
Figure 14:
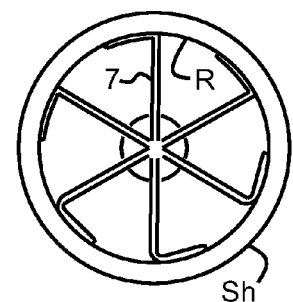

Now referring to FIGS. 13-16, various schematic cross-sectional shrouded lamp and reflector configurations that may be used to practice some embodiments of the instant invention are shown. FIG. 13 shows in cross section a beam-forming device which comprises a lamp L of known construction, fabrication and operation which is retained fixedly inside a beam-forming shroud assembly Sh. The lamp L is shown at the left side of the shroud Sh in the figure, and is generally constructed, sized, retained, positioned and disposed to cast electromagnetic radiation to be emitted in a general output direction at output end 8. An inside surface of the shroud Sh where lamp L resides is a reflective surface R, and optionally, arrayed about the shroud Sh adjacent or as part of this reflective surface R are a series of reflector fins 7, which in this illustrative example, are arrayed (six, total) circumferentially about an axis of the shroud Sh as can be seen in FIG. 14, which shows an end-on view backward into output end 8. The overall diameter of the beam-forming device as shown in the view of FIG. 14 is approximately 8 cm.

Figure 15:
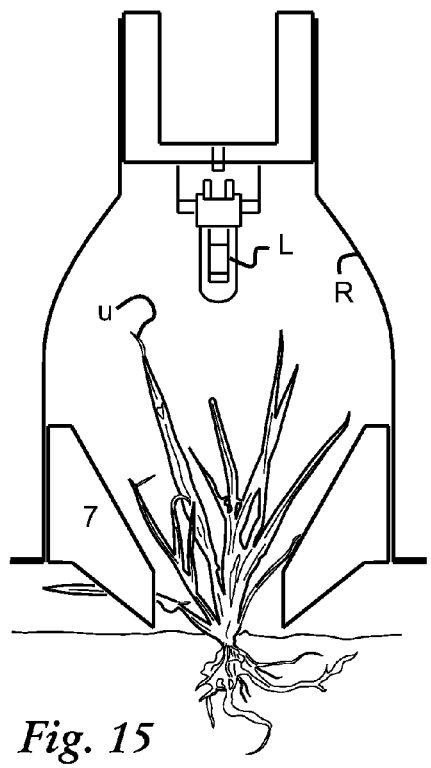

As can be seen in FIG. 15, the shroud Sh and above components can be positioned, forcibly, if necessary, to array output(s) from lamp L to impinge upon a plant in the manner shown in FIG. 11. Upper foliage u of the plant as shown can thus receive intense distribution of near-IR radiation via proximity to lamp L, while reflector fins 7 can assist in clearing foliage, parting of leaves, etc., to allow better access to the plant root crown and soil grade immediately adjacent the root crown, as given in FIG. 11. In this way, a plant can be shrouded with a reflective shroud (Sh) and that shroud can be used to shroud at least one plant leaf to avoid absorption block which would prevent UV-A radiation from reaching the root crown and/or soil grade immediately adjacent the root crown.

Figure 16:
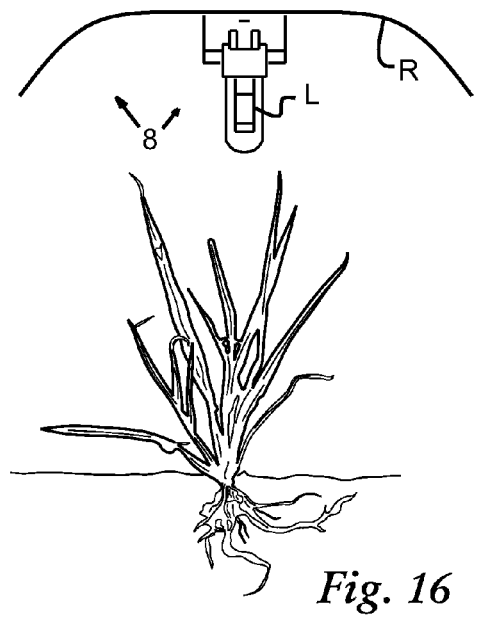

FIG. 16 shows an alternate embodiment, generally not preferred, wherein shroud Sh is minimally beam-forming and lacks reflector fins 7.

Judicious design and selection of reflector shroud designs can be helpful in practicing the invention, which calls for specific targeting of near-IR and UV-A radiations. Now referring to FIG. 17, a schematic cross sectional view of an elliptical reflector shroud configuration is shown that can generate radiation or ray patterns that greatly aid in achieving high lethality using the methods taught here. FIG. 17 shows a shrouded beam forming lamp assembly similar to that shown in FIGS. 13-15, but with improved beam-forming from the output of lamp L. FIG. 18 shows the shrouded beam forming lamp assembly of FIG. 17, in oblique part surface, part cross sectionally view. Specifically, shroud Sh is specifically engineered to allow an inner reflective surface R that is ellipsoid or partially ellipsoid in shape, so that with proper placement and operation of lamp L, beam-forming or ray pattern arrangements are produced using two foci or focal points—a first focal point F1 adjacent or centered in lamp L, and a second focal point F2 just outside the shroud Sh as shown. Sample beam or ray 1 emerging from lamp L as shown is directed downward in the Figure, while sample beams or rays 2 are shown (both left and right sides) impinging upon and being reflected from reflective surface R and being redirected to meet at second focal point F2. Referring to FIG. 19, a view similar to that of FIG. 17 is shown, showing a plant arrayed inside shroud Sh in a similar manner to that shown in FIG. 15, and specifically showing sample beam or ray 2 being reflected from reflective surface R and becoming in essence a Foliage Avoidance Ray as shown, likely avoiding or not being blocked by plant foliage and being redirected so as to impinge upon a soil grade immediately adjacent the root crown, as shown. Lamp L can be engineered and fabricated using known filters, mirrors or split lamp arrangements to allow that sample beams or rays 1 which are essentially coming off from lamp L are preferentially rich in near-IR content, while sample beams or rays 2 are preferentially rich in UV-A content.

Reflector designs which part leaves or other foliage and provide "sideways" foliage avoidance rays for better access to root crowns and soil adjacent to root crowns are preferred.

For lamp construction, the illustrative depictions in this disclosure shall not be limiting, as any known light producing devices capable of providing the requisite radiances can be used. That notwithstanding, certain known ANSI (American National Standards Institute) or other international lamp types and designations of known construction, fabrication and operation can be used to practice the invention, especially since certain halogen lamps that are operated in an unshielded manner, e.g., without glass enclosures, covers, and without using specially doped (UV-shielded) quartz or shielding jackets—can be used to advantage very conveniently to provide for both the near-IR and UV-A components in the RUDCIP Band specification.

During testing and experimentation, certain ANSI lamps were used inside reflective shroud designs as depicted here, with lamps about 5 cm from the shroud aperture or output direction end 8. Unshielded ANSI specified quartz jacketed halogen lamps, using preferably non-doped quartz jackets, were used, such as ANSI designation EVD (650 watts, 60 volts). Other known suitable halogen lamps with undoped bare quartz envelopes or jackets include ANSI types EVD (400 watts, 36 volts) and HLX 64663. Preferably output end 8 is arrayed directly on top of, or immediately adjacent soil for optimal positioning of a plant inside the beam forming shroud Sh with any reflector fins 7 pushed down to penetrate and possibly disturb soil, especially to gain better access to plant root crowns. Generally, unphosphored germicidal and fluorescent lamp UV outputs are not suitable, and while emissions are present in the UV-B range and UV-C range, sufficient emissions do not lie in the UV-A 300-400 nm wavelength range. Xenon-halogen bulb or flash lamps can also be used, or separate lamps that provide separate near-IR emission and UV-A emission can be used, and also light emitting diodes (LEDs) which emit light of desired character, such as ultraviolet emitting LEDs. Practical commercially available ultraviolet light-emitting diodes (LEDs) can be manufactured that presently that emit light in the UV-A range, with emission between 365 nm and 400 nm wavelengths. Such LED arrays are beginning to be used for UV curing applications, digital print applications, ultraviolet curing and cross-linking applications.

Custom engineered, designed and fabricated lamps can be devised by those skilled in the art that can use high effective photoemissive color temperatures, such over 3600 K. These lamps can be custom made using C-bar6, CF-6 or other high temperature operating tungsten filaments, and can feature high luminous flux and high service lifetimes. Operating voltages can be selected to customize the actual UV-A output to suit field conditions.

Reflector fins 7 as shown used for parting leaves, to provide specific radiation imaging to get around foliage obstructions, as well as reflective surfaces R for beam forming, are facilitated by the use of reflector waveguide concepts. Known aluminum materials should preferably have a minimum coefficient of reflection of 85%. Either aluminum sheets or Reflectix Inc. (Markleville, Ind., USA) part number XSBW3 Foil/Bubble or equivalent can be used [ref: Journal of the Optical Society of America/Vol 21/Issue 10/Oct. 1, 1931/page 677/Ultraviolet and Light Reflecting Properties of Aluminum/A. H. Taylor and Junius D. Edwards]. Reflector fins 7 can be of various geometries, and can be used to stab soil if desired to gain better access to root crowns and portions of the root below a soil grade.

Generally, the use of diffuse light is not preferred. The radiations called for in the RUDCIP as taught here should be directed as taught. Diffuse radiations are only effective to the extent that they actually deliver the irradiances called for by the RUDCIP Band specification. Reflectors and beam forming structures are recommended unless the light source(s) used is/are inherently directable as a spot, flood, or patch beam.

Direct delivery of the UV-A radiation for the ground-penetrating UV-A illumination component can be used. Referring now to FIG. 20, an oblique view of a partially schematic stab unit of an invasive hot stab plant eradicator modified to provide emission of UV-A radiation, is shown. This invasive hot stab plant eradicator is the subject of issued U.S. Pat. Nos. 7,954,276 and 8,141,292 and are hereby incorporated into this disclosure in their entirety. Hot stab plant eradicator unit U as shown, can be modified to allow that a UV-A transmissive blade V be employed, whereby a UV-A emitting lamp L (not shown) is in thermal communication with blade V, accomplished using known techniques, to allow UV-A emission (dashed rays shown). Blade V in this case can be used hot, as taught in the references '276 and '292, or cold, and with or without a heated arresting flat T as shown and described in these references. Operation of the hot stab plant eradicator as described in '276 and '292 is shown briefly in FIGS. 21 and 22, where the root R of plant Y is stabbed, creating a stab gash K as shown, and allowing piping in or delivery of UV-A radiation directly into the root or adjacent soil. This is considered equivalent to irradiating the soil immediately adjacent the root crown, because the end result is the same, in that UV-A radiation is delivered to root structure below the soil grade, something that can represent an unusual stress for a plant and is an equivalent for the UV-A component of the instant teachings of the invention.

Certain types of Plexiglas® acrylic sheet or other known polymer, thermoplastic or other materials can be used to form blade V to allow UV-A transmission. Known and commercially available UV-quality fused silica can be used as well to form such a blade. The surface of blade V can be roughened to increase scattering and light output, using known techniques.

Now referring to FIG. 23, a schematic series of apparatus and process components for using the teachings of the instant invention with machine recognition and automated processes is shown. Machine vision and recognition of undesirable plants is possible using known techniques and can be used with the instant invention to provide automated detection and eradication of nuisance vegetation.

Known leaf reflectance and transmittance spectra depend on light absorption by leaf pigments and reflectance/transmittance from light multi-scattering within leaves as a function of refractive index and leaf anatomical structure. As known in the art, leaf reflectance varies with four basic biophysical properties including internal leaf anatomy, chlorophyll concentration, water content and dry matter concentration. Reflectance for plant leaves from UV through IR range (330-1300 nm) demonstrate four different reflectance patterns: 1) 330-450 nm and 680 nm with a small peak at 550 nm (green edge); 2) peak between 680-750 nm (red edge); peak at 780-1300 nm (near an infrared plateau); and decreased reflectance at 1300-2500 nm. Reflectance patterns of plant pigments show peaks for chlorophyll at 550 and 700 nm; 550 nm for anthocyanins; and 510-520 nm for carotenoids.

Field leaf reflectance may vary with environmental parameters like soil type, light conditions, irregular terrain, and maintenance inputs (fertilizer, watering, etc.); as well as, plant variables such as irregular/dense sowing patterns, different plant species, growth stages, leaf moisture, and similar color of crop and weeds.

Machine vision to distinguish weeds in lawns, for example, can operate despite lawn condition variables such as soil characteristics and maintenance variables such as fertilizer and cut frequencies. Spectral reflectance variables can be detected using known methods to distinguish growth habits and differences in plant canopies, such as differences in an erectophile canopy versus a planophile canopy.

FIG. 23 shows known ultraviolet (UV) or visible (VIS) lights which illuminate a Field as shown. An image is received with a known Imager as shown, such as a imager system using a CCD (Charge Coupled Device) camera. The optical system can be controlled by a known electronic system that will flash the UV/Visible lights for a specific time in rapid succession. A known Light flash controller (shown) also triggers the CCD camera to capture an image shown (Image Capture) that uses Image pattern recognition, employing known techniques, to send signals to a Controller that selectively operates a Weed Disruptor that uses the teachings and methods given here.

Using known techniques, selected spectral regions for gathering information can processed. The wavelengths can be chosen based on weed reflection characteristics that distinguish them from grass or any desired crop. The images can be processed to register them with one another and determine the optical responses at each pixel. Automatic recognition of weeds will also include displaying edge effects for plant morphology determination and pinpointing root position. A known algorithm can include segmenting the scene for rapid identification and classification. Known electronics for post-processing images can be simple designs using graphics processing units (GPUs), field-programmable gated arrays and smart phones. Once a weed has been identified, the position of the target plant is passed to the controller that positions a device to act according to the instant teachings.

Such a machine recognition system can be a module positioned in front of the weed treatment mobile unit as depicted in the schematic shown in FIG. 24. Wheels on the mobile unit can record track positions and store information in a memory, whose construction, fabrication and interlacing is known in the art. During each flash of UV/visible light, the reflected light is collected by a CCD camera with high dynamic range. Images can be processed onboard the mobile unit and the controller can be used to place appropriate components as disclosed here over a target weed for processing.

The imager as shown in FIG. 24 can be mounted in front of a carriage that houses electronics. This carriage can be part of the mobile unit. The position of the carriage is encoded by a known digital sensing system synchronized with the rotation of the wheels. This information is used in by a control algorithm constructed by those with ordinary skill in the art, with image ID results to automatically place desired operative components over the weed root position or turn on the appropriate near-IR and UV-A light heads of known design, if multiple IR/UV heads are to be used.

A weed region segmentation algorithm can be based on a known adaptive progressive thresholding (APT) approach which automatically estimates the threshold value to accurately differentiate the weed region from the desired crop or grass. This technique employs a recursive procedure to obtain a coarse region of interest (ROI), which is then subjected to an adaptive filter operation so that a smaller enhanced region can be identified. This enhanced region is subjected to the APT procedure again and then the process of performing the filtering operation is repeated as before. Repetition of this process in an iterative manner facilitates the rapid identification of the weed region accurately. The iterative procedure can be stopped by employing a pre-computed cumulative limiting factor (CLF), which depends on the complexity of the images due to the unpredictable reflection characteristics of the environment, leading to the extraction of accurate weed regions in the images. Known techniques can use this to advantage in segmentation and classification of broadleaf and grass weeds. Known feature extraction can be achieved using Gabor wavelets. Gabor wavelet features indicate the frequency content in localized frequency regions in the spatial domain. A Gabor wavelet transform can be obtained by convolving the signal with a filter bank in a known manner, whose impulse response in the time domain can be Gaussian-modulated by sine and cosine waves. Different choices of frequency and orientation provide a set of filters. A feed forward neural network with error back-propagation learning algorithm can be employed for weed classification based on the extracted Gabor wavelet features. These algorithms can be developed for rapid post processing of the imagery captured by the CCD cameras.

Now referring to FIG. 25, a listing of possible adaptive stress vectors upon a plant which can arise while practicing the instant invention. Although no theory is given here and the following is not to be limiting, these are possible stress factors which may contribute to the unexpected degree of success using the invention. Plants subjected to the Rapid Unnatural Dual Component Protocol as described here may be stressed by three simultaneous factors, including stresses delivered by the methods of the invention that constitute in some senses, a Forest Fire (above ground); High Intensity unprecedented UV-A signaling at root crown/below soil grade, and a High velocity shift in illumination exposure levels as a result of practicing the invention by exposures of near-IR and UV-A as taught over a short time interval. This unnatural and simultaneous set of possible stresses may cause a plant to perish because it has not evolved to meet those stresses simultaneously.

To the extent that the methods of the invention may not work as well on certain plant species or for certain root structures, such as tap-root or woody stalk plants, the methods given here can nonetheless contribute to lethality and the methods given here are not dependent on a particular species, in spite of Red River Crabgrass (*Digitaria cilaris*) being used as a basis, because of empirical experience.

The illumination protocol disclosed and claimed here can be supplemented with visible light, which enhances user safety by increasing avoidance and can allow for pupil contraction of an operator. Other radiations can be added with without detracting from the method.

There is obviously much freedom to exercise the elements or steps of the invention.

The description is given here to enable those of ordinary skill in the art to practice the invention. Many configurations are possible using the instant teachings, and the configurations and arrangements given here are only illustrative.

Those with ordinary skill in the art will, based on these teachings, be able to modify the invention as shown.

The invention as disclosed using the above examples may be practiced using only some of the optional features mentioned above. Also, nothing as taught and claimed here shall preclude addition of other structures or functional elements.

Obviously, many modifications and variations of the present invention are possible in light of the above teaching. It is therefore to be understood that, within the scope of the appended claims, the invention may be practiced otherwise than as specifically described or suggested here.

We claim:

1. A substantially non-invasive low-energy low irradiance non-mutating method for eradicating a plant in a time under one minute, using a Rapid Unnatural Dual Component Illumination Protocol (RUDCIP) with illumination about said plant, said method comprising:
   - [1] An above-ground foliage and root crown damage illumination component comprising exposure to near-IR radiation directed to any of a foliage of said plant and a root crown of said plant, said near-IR radiation of irradiance $E_{near-IR}$ in W/m² and a total exposure time $T_{near-IR}$ in seconds following a RUDCIP Band (RUDCIP BAND) specification;
   - [2] A ground-penetrating UV-A illumination component, comprising exposure to UV-A radiation
   - directed to any of a root crown of said plant and a soil grade immediately adjacent said root crown; said UV-A radiation of irradiance $E_{UV-A}$ in W/m² and a total exposure time $T_{UV-A}$ in seconds following said RUDCIP Band specification;
   - said above-ground foliage and root crown damage illumination component and said ground-penetrating UV-A illumination component each having said exposure times $T_{near-IR}$ and $T_{UV-A}$ of under one minute of total operation, respectively;
   - said RUDCIP Band specification comprising a Red River Crabgrass (*Digitaria cilaris*) protocol specification given by $$L = 5.5 \times 10^{-6} [E_{near-IR}] * T_{near-IR} + 6.5 \times 10^{-5} [E_{UV-A}] * T_{UV-A}$$

where L is lethality effectiveness expressed in fraction of plants dead in 30 days, such that L is greater than zero and equal to or less than unity:
   - said RUDCIP Band specification further specifying that said UV-A irradiance $E_{UV-A}$ is within a factor of three above or below said Red River Crabgrass (*Digitaria cilaris*) protocol specification, such that said UV-A radiation has an over-riding minimum irradiance $E_{UV-A}$ of 60 W/m²; and
   - said RUDCIP band specifying further that said near-IR irradiance $E_{near-IR}$ is between a maximum of 27,000 W/m² and a minimum of 270 W/m2.

2. The method of claim 1, additionally comprising shrouding said plant with a reflective shroud (Sh) to provide at least one foliage avoidance ray derived from said UV-A radiation.

3. The method of claim 1, additionally comprising shrouding said plant with a reflective shroud (Sh) and using it to perform any of a stab and a disturb of said soil grade.

4. The method of claim 1, additionally comprising shrouding said plant with a reflective shroud (Sh) and using it to shroud at least one plant leaf to avoid absorption block.

5. The method of claim 1, wherein said above-ground foliage and root crown damage illumination component and said ground-penetrating UV-A illumination component occur at least partially simultaneously.

6. The method of claim 1, wherein said total exposure times $T_{near-IR}$ and $T_{UV-A}$ are each of duration under 20 seconds.

7. The method of claim 1, wherein said total exposure times $T_{near-IR}$ and $T_{UV-A}$ are each of duration under 5 seconds.

8. The method of claim 1, wherein said total exposure times $T_{near-IR}$ and $T_{UV-A}$ are each of duration under 1 second.

9. The method of claim 1, wherein said exposure to UV-A radiation directed to any of a root crown of said plant and a soil grade immediately adjacent said root crown is delivered via a UV-A transmissive knife blade (V).

10. The method of claim 1, additionally comprising locating said plant using machine recognition, and performing the method of claim 1 on the plant so located.

11. A substantially non-invasive low-energy low irradiance non-mutating method for eradicating a plant in a time under one minute, using a high velocity shift in illumination exposure levels to introduce an adaptive stress, said method comprising:
   - [1] Delivering an exposure directed to any of a root crown of said plant and a soil grade immediately adjacent said root crown, said exposure providing sufficient UV-A irradiance to allow UV-A exposure levels of at least 5 times a prevailing ambient UV-A exposure level for no longer than one minute of total operation, but no more than 14 kJ (kiloJoules) per square meter in total; and
   - [2] Delivering an exposure directed to any of foliage of said plant and said root crown, said exposure providing a near-IR irradiance $E_{near-IR}$ between a maximum of 27,000 W/m2 and a minimum of 270 W/m2 for no longer than one minute of total operation.

12. The method of claim 11, additionally comprising shrouding said plant with a reflective shroud (Sh) to provide at least one foliage avoidance ray derived from said UV-A radiation.

13. The method of claim 11, additionally comprising shrouding said plant with a reflective shroud (Sh) and using it to perform any of a stab and a disturb of said soil grade.

14. The method of claim 11, additionally comprising shrouding said plant with a reflective shroud (Sh) and using it to shroud at least one plant leaf to avoid absorption block.

15. The method of claim 11, wherein said UV-A exposure levels and said near-IR irradiance occur at least partially simultaneously.

16. The method of claim 11, wherein said UV-A exposure levels and said near-IR irradiance occur in a total time under 20 seconds.

17. The method of claim 11, wherein said UV-A exposure levels and said near-IR irradiance occur in a total time under 5 seconds.

18. The method of claim 11, wherein said UV-A exposure levels and said near-IR irradiance occur in a total time under 1 second.

19. The method of claim 11, wherein said exposure to UV-A radiation directed to any of a root crown of said plant and a soil grade immediately adjacent said root crown is delivered via a UV-A transmissive knife blade (V).

20. The method of claim 11, additionally comprising locating said plant using machine recognition, and performing the method of claim 11 on the plant so located.

* * * * *